(12) United States Patent
Linton et al.

(10) Patent No.: US 9,134,459 B2
(45) Date of Patent: Sep. 15, 2015

(54) OPTICAL COMPONENT, PRODUCTS INCLUDING SAME, AND METHODS FOR MAKING SAME

(75) Inventors: John R. Linton, Concord, MA (US); Emily M. Squires, Littleton, MA (US); Rohit Modi, Waltham, MA (US); David Gildea, Watertown, MA (US)

(73) Assignee: QD VISION, INC., Lexington, MA (US)

( * ) Notice: Subject to any disclaimer, the term of this patent is extended or adjusted under 35 U.S.C. 154(b) by 179 days.

(21) Appl. No.: 13/448,079

(22) Filed: Apr. 16, 2012

(65) Prior Publication Data
US 2012/0313075 A1 Dec. 13, 2012

Related U.S. Application Data

(63) Continuation of application No. PCT/US2010/053073, filed on Oct. 18, 2010.

(60) Provisional application No. 61/252,658, filed on Oct. 17, 2009, provisional application No. 61/252,743, filed on Oct. 19, 2009, provisional application No. 61/291,072, filed on Dec. 30, 2009.

(51) Int. Cl.
| | |
|---|---|
| *H01L 29/06* | (2006.01) |
| *H01L 31/00* | (2006.01) |
| *G02B 1/00* | (2006.01) |

(52) U.S. Cl.
CPC .......... *G02B 1/002* (2013.01); *Y10T 428/24876* (2015.01)

(58) Field of Classification Search
CPC .............. H01L 51/502; H01L 31/035218; H01L 31/03845; H01L 2251/5384; G02B 1/002

USPC .......................................................... 257/13
IPC ....................................................... G02B 1/002
See application file for complete search history.

(56) References Cited

U.S. PATENT DOCUMENTS

| 5,199,098 A | 3/1993 | Nolan et al. |
| 5,885,482 A * | 3/1999 | Asaoka et al. ........... 252/299.01 |

(Continued)

FOREIGN PATENT DOCUMENTS

| CN | 100435016 C | 11/2008 |
| JP | 2003138233 A | 5/2003 |

(Continued)

OTHER PUBLICATIONS

1st Office Action in counterpart Chinese Patent Application No. 2010-80046912.2, mailed Dec. 26, 2013. (Chinese).

(Continued)

*Primary Examiner* — William D Coleman

(57) ABSTRACT

An optical component is disclosed that comprises a first substrate, an optical material comprising quantum confined semiconductor nanoparticles disposed over a predetermined region of a first surface of the first substrate, a layer comprising an adhesive material disposed over the optical material and any portion of the first surface of the first substrate not covered by the optical material, and a second substrate disposed over the layer comprising an adhesive material, wherein the first and second substrates are sealed together. In certain embodiments, the optical component further includes a second optical material comprising quantum confined semiconductor nanoparticles disposed between the layer comprising the adhesive material and the second substrate. Method are also disclosed. Also disclosed are products including the optical component.

34 Claims, 4 Drawing Sheets

(56) References Cited

U.S. PATENT DOCUMENTS

| | | | |
|---|---|---|---|
| 6,322,901 B1 | 11/2001 | Bawendi et al. | |
| 6,501,091 B1 | 12/2002 | Bawendi et al. | |
| 6,572,784 B1* | 6/2003 | Coombs et al. | 252/301.16 |
| 6,576,291 B2 | 6/2003 | Bawendi et al. | |
| 6,600,175 B1 | 7/2003 | Baretz et al. | |
| 6,608,332 B2 | 8/2003 | Shimizu et al. | |
| 6,613,247 B1 | 9/2003 | Höhn et al. | |
| 6,692,031 B2* | 2/2004 | McGrew | 283/93 |
| 6,744,960 B2 | 6/2004 | Pelka | |
| 6,784,603 B2 | 8/2004 | Pelka et al. | |
| 6,878,871 B2 | 4/2005 | Scher et al. | |
| 7,091,653 B2 | 8/2006 | Ouderkirk et al. | |
| 7,108,416 B1 | 9/2006 | Osawa | |
| 7,144,131 B2 | 12/2006 | Rains | |
| 7,168,833 B2 | 1/2007 | Schottland et al. | |
| 7,198,832 B2 | 4/2007 | Burrows et al. | |
| 7,253,452 B2 | 8/2007 | Coe-Sullivan et al. | |
| 7,294,861 B2 | 11/2007 | Schardt et al. | |
| 7,374,807 B2 | 5/2008 | Parce et al. | |
| 7,390,568 B2 | 6/2008 | Kim et al. | |
| 7,474,286 B2 | 1/2009 | Hajjar et al. | |
| 7,553,683 B2 | 6/2009 | Martin et al. | |
| 7,695,150 B2 | 4/2010 | Dejima et al. | |
| 7,703,942 B2 | 4/2010 | Narendran et al. | |
| 7,723,744 B2 | 5/2010 | Gillies et al. | |
| 7,733,310 B2 | 6/2010 | Hajjar et al. | |
| 7,750,359 B2 | 7/2010 | Narendran et al. | |
| 7,791,561 B2 | 9/2010 | Hajjar et al. | |
| 7,837,348 B2 | 11/2010 | Narendran et al. | |
| 8,030,664 B2* | 10/2011 | Moon et al. | 257/79 |
| 8,084,934 B2 | 12/2011 | Kim et al. | |
| 8,128,249 B2 | 3/2012 | Skipor et al. | |
| 8,294,168 B2 | 10/2012 | Park et al. | |
| 8,343,575 B2 | 1/2013 | Dubrow | |
| 8,360,617 B2 | 1/2013 | Gillies et al. | |
| 8,405,063 B2* | 3/2013 | Kazlas et al. | 257/9 |
| 8,451,402 B2 | 5/2013 | Oshima et al. | |
| 8,470,617 B2 | 6/2013 | Coe-Sullivan et al. | |
| 8,697,471 B2 | 4/2014 | Dubrow | |
| 8,718,437 B2 | 5/2014 | Coe-Sullivan et al. | |
| 8,759,850 B2 | 6/2014 | Coe-Sullivan et al. | |
| 8,849,087 B2 | 9/2014 | Breen et al. | |
| 8,876,272 B2 | 11/2014 | Linton et al. | |
| 2002/0127224 A1 | 9/2002 | Chen | |
| 2004/0012083 A1 | 1/2004 | Farrell et al. | |
| 2004/0023010 A1 | 2/2004 | Bulovic et al. | |
| 2004/0091710 A1 | 5/2004 | Bawendi et al. | |
| 2004/0245912 A1 | 12/2004 | Thurk et al. | |
| 2004/0262583 A1 | 12/2004 | Lee | |
| 2005/0045269 A1 | 3/2005 | Tateishi | |
| 2005/0045900 A1 | 3/2005 | Silvernail | |
| 2005/0069644 A1 | 3/2005 | Hsieh et al. | |
| 2005/0116621 A1 | 6/2005 | Bellman et al. | |
| 2005/0126628 A1 | 6/2005 | Scher et al. | |
| 2005/0135079 A1 | 6/2005 | Chua et al. | |
| 2005/0155704 A1 | 7/2005 | Yokajty et al. | |
| 2005/0194896 A1 | 9/2005 | Sugita et al. | |
| 2005/0214536 A1 | 9/2005 | Schrier et al. | |
| 2005/0236556 A1 | 10/2005 | Sargent | |
| 2005/0249901 A1 | 11/2005 | Yializis et al. | |
| 2005/0274944 A1 | 12/2005 | Jang et al. | |
| 2005/0287348 A1 | 12/2005 | Faler et al. | |
| 2006/0002101 A1 | 1/2006 | Wheatley et al. | |
| 2006/0003114 A1 | 1/2006 | Enlow et al. | |
| 2006/0034065 A1 | 2/2006 | Thurk | |
| 2006/0056166 A1 | 3/2006 | Yeo et al. | |
| 2006/0068090 A1 | 3/2006 | Monbouquette et al. | |
| 2006/0069314 A1 | 3/2006 | Farr | |
| 2006/0071218 A1 | 4/2006 | Takeda et al. | |
| 2006/0081862 A1 | 4/2006 | Chua et al. | |
| 2006/0103589 A1 | 5/2006 | Chua et al. | |
| 2006/0145599 A1 | 7/2006 | Stegamat et al. | |
| 2006/0196375 A1 | 9/2006 | Coe-Sullivan et al. | |
| 2007/0004065 A1 | 1/2007 | Schardt et al. | |
| 2007/0012928 A1 | 1/2007 | Peng et al. | |
| 2007/0110965 A1* | 5/2007 | Bergsmann | 428/195.1 |
| 2007/0170418 A1 | 7/2007 | Bowers et al. | |
| 2007/0273274 A1 | 11/2007 | Horiuchi et al. | |
| 2008/0001167 A1 | 1/2008 | Coe-Sullivan et al. | |
| 2008/0020235 A1 | 1/2008 | Parce et al. | |
| 2008/0029710 A1 | 2/2008 | Sekiya et al. | |
| 2008/0079015 A1* | 4/2008 | Krummacher | 257/98 |
| 2008/0237540 A1 | 10/2008 | Dubrow | |
| 2008/0246017 A1 | 10/2008 | Gillies et al. | |
| 2009/0034057 A1 | 2/2009 | LeCain et al. | |
| 2009/0091689 A1 | 4/2009 | Rho et al. | |
| 2009/0116107 A1 | 5/2009 | Kindler et al. | |
| 2009/0162011 A1 | 6/2009 | Coe-Sullivan et al. | |
| 2009/0181478 A1 | 7/2009 | Cox et al. | |
| 2009/0208753 A1 | 8/2009 | Coe-Sullivan et al. | |
| 2009/0215208 A1 | 8/2009 | Coe-Sullivan et al. | |
| 2009/0215209 A1 | 8/2009 | Anc et al. | |
| 2009/0236621 A1 | 9/2009 | Chakraborty | |
| 2009/0242871 A1 | 10/2009 | Kobayashi et al. | |
| 2009/0278141 A1 | 11/2009 | Coe-Sullivan et al. | |
| 2009/0280586 A1 | 11/2009 | Coe-Sullivan | |
| 2009/0283742 A1 | 11/2009 | Coe-Sullivan et al. | |
| 2009/0283743 A1 | 11/2009 | Coe-Sullivan et al. | |
| 2009/0283778 A1 | 11/2009 | Coe-Sullivan et al. | |
| 2009/0286338 A1 | 11/2009 | Coe-Sullivan et al. | |
| 2010/0051898 A1 | 3/2010 | Kim et al. | |
| 2010/0110728 A1 | 5/2010 | Dubrow et al. | |
| 2010/0129666 A1 | 5/2010 | Logunov et al. | |
| 2010/0150513 A1* | 6/2010 | Zhang et al. | 385/131 |
| 2010/0155744 A1 | 6/2010 | Jang et al. | |
| 2010/0155749 A1 | 6/2010 | Chen et al. | |
| 2010/0167011 A1 | 7/2010 | Dubrow | |
| 2010/0225229 A1* | 9/2010 | Hosoda et al. | 313/504 |
| 2010/0265307 A1 | 10/2010 | Linton et al. | |
| 2010/0283014 A1 | 11/2010 | Breen et al. | |
| 2011/0095261 A1 | 4/2011 | Kazlas et al. | |
| 2011/0103064 A1 | 5/2011 | Coe-Sullivan et al. | |
| 2011/0135857 A1 | 6/2011 | Logunov et al. | |
| 2011/0186811 A1 | 8/2011 | Coe-Sullivan et al. | |
| 2011/0199555 A1 | 8/2011 | Coe-Sullivan et al. | |
| 2011/0303940 A1 | 12/2011 | Lee et al. | |
| 2011/0317397 A1 | 12/2011 | Trottier et al. | |
| 2012/0113671 A1 | 5/2012 | Sadasivan et al. | |
| 2012/0113672 A1 | 5/2012 | Dubrow et al. | |
| 2012/0170257 A1 | 7/2012 | Van Dijk et al. | |
| 2012/0187367 A1 | 7/2012 | Modi et al. | |
| 2012/0189791 A1 | 7/2012 | Modi et al. | |
| 2012/0195022 A1 | 8/2012 | Skipor et al. | |
| 2012/0286238 A1 | 11/2012 | Linton et al. | |
| 2013/0125516 A1 | 5/2013 | Bayne et al. | |
| 2013/0148376 A1 | 6/2013 | Nick et al. | |
| 2013/0181603 A1 | 7/2013 | Dubrow et al. | |
| 2013/0196460 A1 | 8/2013 | Dubrow et al. | |
| 2013/0206230 A1 | 8/2013 | Sridharan et al. | |
| 2013/0294048 A1 | 11/2013 | Asano et al. | |
| 2014/0009964 A1 | 1/2014 | Dubrow et al. | |
| 2014/0027673 A1 | 1/2014 | Nick et al. | |
| 2014/0030507 A1 | 1/2014 | Yoshida et al. | |
| 2014/0061584 A1 | 3/2014 | Mahan et al. | |

FOREIGN PATENT DOCUMENTS

| | | |
|---|---|---|
| JP | 2005025970 A | 1/2005 |
| JP | 2009071005 A | 4/2009 |
| KR | 100982992 | 9/2010 |
| WO | WO2005041160 A2 | 5/2005 |
| WO | WO2011053635 A1 | 5/2005 |
| WO | WO2007117698 A2 | 10/2007 |
| WO | WO2007143197 A2 | 12/2007 |
| WO | WO2008033388 A2 | 3/2008 |
| WO | WO2008111947 A1 | 9/2008 |
| WO | WO2009002512 A1 | 12/2008 |
| WO | WO2009014590 A2 | 1/2009 |
| WO | WO2009151515 A1 | 12/2009 |
| WO | WO2011047385 A1 | 4/2011 |
| WO | WO2012012675 A1 | 1/2012 |
| WO | WO2013108125 A2 | 7/2013 |

(56) References Cited

FOREIGN PATENT DOCUMENTS

| WO | WO2013122819 A1 | 8/2013 |
|----|-----------------|--------|
| WO | WO2013122820 A1 | 8/2013 |
| WO | WO2014113562 A1 | 7/2014 |

OTHER PUBLICATIONS

1st Office Action in counterpart Chinese Patent Application No. 2010-80046912.2, mailed Dec. 26, 2013. (English transl.).
1st Office Action in counterpart Japanese Patent Application No. 2012-534439, mailed Jun. 17, 2014. (English transl.).
1st Office Action in counterpart Japanese Patent Application No. 2012-534439, mailed Jun. 17, 2014. (Japanese).
Dabbousi, et al., "(CdSe) ZnS Core-Shell Quantum Dots: Synthesis and Characterizaqtion of a Size Series of Highly Luminescent Nanocrystallites", *J. Phys. Chem.* 101, 9463, 1997.
De Mello et al., "An Improved Experimental Determination of External Photoluminescence Quantum Efficiency", *Adv. Mater.* 9(3):230 (1997).
Hermanns C., "Laser separation of flat glass in electronic-, optic-, display- and bio-industry", Proc. of SPIE, vol. 5713 (2005), pp. 387-396.
Hudson, D.M., "The Use of Contact Angle Analysis to Determine Surface Cleanliness", Metal Finishing (Oct. 1997), pp. 26-27.
Ito, Y., et al., "A Backlight System with a Phosphor Sheet Providing both Wider Color Gamut and Higher Efficiency", *SID 2013 Digest*, vol. 59.1, pp. 816-819.
Kumar, A., et al., "Features of gold having micrometer to centimeter dimensions can be formed through a combination of stamping with an elastomeric stamp and an alkanethiol 'ink' followed by chemical etching", *Appl. Phys. Lett.*, 63, pp. 2002-2004, (1993).
Kyowa brochure, "LCD & FPD—LCD Glass Cleanness and Treatment Analyzer & Flat Panel Contact Angle Meter", Kyowa Interface Science Co., Ltd., (Document properties lists date as Mar. 19, 2008). http://face-kyowa.com/en/products/fpdmh20/FPD-MH20.pdf.
Lee, J., "Full Color Emission from II-VI Semiconductor Quantum Dot-Polymer Composites", *Adv. Mater.*, (2000), vol. 12, No. 15, p. 1102.
Murray, C., et al., "Synthesis and Characterization of Nearly Monodisperse CdE (E = S, Se, Te) Semiconductor Nanocrystallites" (Nov. 1993), *J. Am. Chem. Soc.*, 115, pp. 8706-8715.
Murray, C., Thesis entitled "Synthesis and Characterization of II-VI Quantum Dots and Their Assembly into 3-D Quantum Dot Superlattices", Massachusetts Institute of Technology, Sep. 1995.
PCT Search Report and Written Opinion in parent PCT application No. PCT/US2010/053073 mailed Dec. 28, 2010.
Santhanam, V. et al., "Microcontact Printing of Uniform Nanoparticle Arrays", *Nano Letters*, 4, (2004), pp. 41-44.
Search Report in counterpart Chinese Patent Application No. 2010-80046912.2, dated Dec. 18, 2013. (Chinese).
Search Report in counterpart Chinese Patent Application No. 2010-80046912.2, dated Dec. 18, 2013. (English transl.).
*The Economist*, "Quantum dots: A quantum leap for lighting", From the print edition: Technology Quarterly, Mar. 4, 2010.
Ziegler, Jan, "Ph/D/ thesis Preparation and application of nanocrystals for white LEDs". Oct. 1, 2007. School of Chemical Sciences and Pharmacy, University of East Anglia, Norwich UK, Norwich, UK.
Second Office Action, issued Nov. 15, 2014, in counterpart Chinese Patent Application No. 2010-80046912.2. (Chinese). No new reference materials are cited. Referred to in the Second Office Action are already of record.
QD Vision, Inc. press release entitled, "Nexxus Lighting and QD Vision Unveil World's First Commercial Quantum DOT/LED Lamp Line," May 5, 2009, www.qdvision.com.
80046912.2. (Chinese). No new reference materials are cited. Referred to in the Second Office Action are already of record.
Second Office Action, issued May 19, 2015, in counterpart Japanese Patent Application No. 2012-534439. One new reference, D4—JP2003138233, JP Second Office Action; D1-D3 are previously of record.

* cited by examiner

OPTICAL COMPONENT, PRODUCTS INCLUDING SAME, AND METHODS FOR MAKING SAME

This application is a continuation of commonly owned International Application No. PCT/US2010/053073 filed 18 Oct. 2010, which was published in the English language as PCT Publication No. WO 2011/047385 A1 on 21 Apr. 2011, which International Application claims priority to U.S. Application Nos. 61/252,658 filed 17 Oct. 2009, 61/252,743 filed 19 Oct. 2009, and 61/291,072 filed 30 Dec. 2009. Each of the foregoing is hereby incorporated herein by reference in its entirety.

TECHNICAL FIELD OF THE INVENTION

The present invention relates to the technical field of optical components, products including same, and related methods, and more particularly to optical components including nanoparticles, products including same, and related methods.

SUMMARY OF THE INVENTION

The present invention relates to an optical component including nanoparticles, a process for making an optical component including nanoparticles, and products including an optical component including nanoparticles.

In accordance with one aspect of the present invention, there is provided an optical component comprising a first substrate, an optical material comprising quantum confined semiconductor nanoparticles disposed over a predetermined region of a first surface of the first substrate, a layer comprising an adhesive material disposed over the optical material and any portion of the first surface of the first substrate not covered by the optical material, and a second substrate disposed over the layer comprising the adhesive material, wherein the first and second substrates are sealed together by the layer comprising the adhesive material.

In certain embodiments, the optical component can include an edge seal area between the perimeter of the predetermined region comprising optical material and the edges of the sealed structure, wherein the edge seal area includes no optical material.

In certain embodiments, the edge seal area can be substantially uniform, and more preferably uniform, around the perimeter of the optical material.

In certain embodiments, the optical component further includes a second optical material comprising quantum confined semiconductor nanoparticles disposed between the layer comprising the adhesive material and the second substrate.

In certain embodiments, the first and second optical materials comprise predetermined arrangements that can be the same or different.

In certain preferred embodiments, the second optical material comprises an arrangement that is the same as the arrangement of the first optical material disposed over the first predetermined region of the first surface of the first substrate.

In certain preferred embodiments, the first and second optical materials are aligned one over the other.

In preferred embodiments, the optical component further includes a second optical material comprising quantum confined semiconductor nanoparticles disposed over a second predetermined region of a first surface of the second substrate, and the layer comprising the adhesive material is disposed between the optical materials on the first and second substrates and any portions of the first surface of the first substrate and first surface of the second substrate not covered by the optical materials. In certain of such embodiments, the predetermined regions are aligned one over the other. In certain preferred embodiments, the predetermined regions completely overlie each other.

In certain embodiments, the optical component includes an edge seal area between the perimeter of the optical materials and the edges of the sealed structure wherein the edge seal area includes no optical material. In certain embodiments, the edge seal area can be substantially uniform, and more preferably uniform, around the perimeter of the optical materials.

In certain preferred embodiments, the edge seal areas of each of the substrates are aligned relative to each other in the sealed structure to overlie each other.

In certain embodiments, at least one, and preferably both of the substrate surfaces between which an optical material and adhesive layer disposed are non-smooth. In certain of such embodiments, one or both of such substrate surfaces are textured. In certain of such embodiments, one or both of such substrate surfaces are roughened. In certain of such embodiments, one or both of such substrate surfaces are etched.

In certain preferred embodiments, one or both of such non-smooth substrate surfaces has surface roughness (Ra—arithmetic average profile roughness parameter) greater than 1000 Angstroms.

In certain embodiments, the non-smooth area does not completely cover the substrate or substrates, but is patterned by standard methods (such as masking or selective roughening, etching, texturizing, etc.).

In certain embodiments, one or both of the substrate surfaces between which an optical material and adhesive are disposed are smooth (e.g., Ra is less than about 100 Angstroms). In certain of such embodiments, at least one, and preferably both of any such smooth substrate surfaces has a water contact angle at an air-substrate interface no greater than 40°, preferably no greater than 25°, and more preferably no greater than 15°.

In certain embodiments, one or both of the substrates is at least 80% optically transparent to at least predetermined wavelengths of light passing into and out of the optical component. In certain embodiments, one or both of the substrates is at least 85% optically transparent to at least predetermined wavelengths of light passing into and out of the optical component. In certain embodiments, one or both of the substrates is at least 90% optically transparent to at least predetermined wavelengths of light passing into and out of the optical component. In certain embodiments, one or both of the substrates is at least 95% optically transparent to at least predetermined wavelengths of light passing into and out of the optical component. In certain embodiments, one or both of the substrates is at least 99% optically transparent to at least predetermined wavelengths of light passing into and out of the optical component In certain embodiments, an optical material comprises one or more different types of quantum confined semiconductor nanoparticles (based on composition, structure and/or size or the nanoparticle), wherein each different type of quantum confined semiconductor nanoparticles emits light at predetermined wavelength that can be the same or different from the predetermined wavelength emitted by any other type of quantum confined semiconductor nanoparticles included in the optical material. The predetermined wavelengths are selected based on the intended end-use application for an optical component. In certain embodiments including two or more different types of quantum confined semiconductor nanoparticles, at least two of the types are capable of emitting light at a predetermined wavelength that is different from that emitted by at least one other type of quantum confined semiconductor nanoparticles that may be included in the optical component.

In certain embodiments including two or more different types of quantum confined semiconductor nanoparticles that emit at different predetermined wavelengths, the different types of quantum confined semiconductor nanoparticles can be included in one or more different optical materials.

In certain embodiments, for example, the predetermined wavelength can be in a range from about 470 nm to about 650 nm, from about 580 nm to about 630 nm, from about 590 nm to about 630 nm, from about 590 nm to about 630 nm, or from about 600 nm to about 620 nm, from about 600 to about 610, or from about 608 to about 618.

In certain embodiments including two or more different optical materials, such different optical materials can, for example, be included as separate layers of a layered arrangement and/or as separate features of a patterned layer.

In certain embodiments, an optical component can include one or more separate layers comprising one or more optical materials. In certain embodiments, one or more of the separate layers can comprise the same optical material. In certain embodiments, including more than one layer comprising optical material, not all of the layers comprise the same optical material. In certain embodiments, two or more of the layers can comprise optical materials that are not the same. In certain embodiments, each of the separate layers can comprise an optical material different from each of the other optical materials included in the other layers.

In certain preferred embodiments, quantum confined semiconductor nanoparticles comprise semiconductor nanocrystals.

In certain embodiments, an optical material including quantum confined semiconductor nanoparticles has a solid state quantum efficiency of at least 40%.

In certain embodiments, an optical material comprises quantum confined semiconductor nanoparticles capable of emitting light in one or more predetermined spectral regions.

In certain embodiments, an optical material further comprises a host material in which the quantum confined semiconductor nanoparticles are distributed. In certain embodiments, quantum confined semiconductor nanoparticles are included in an optical material in an amount in a range from about 0.001 to about 5 weight percent of the weight of the host material. In certain embodiments, quantum confined semiconductor nanoparticles are included in an optical material in an amount in a range from about 0.1 to about 3 weight percent of the weight of the host material. In certain embodiments, quantum confined semiconductor nanoparticles are included in an optical material in an amount in a range from about 0.5 to about 3 weight percent of the weight of the host material. In certain embodiments, quantum confined semiconductor nanoparticles are included in an optical material in an amount in a range from about 0.1 to about 2 weight percent of the weight of the host material. In certain embodiments, quantum confined semiconductor nanoparticles are included in an optical material in an amount in a range from about 0.1 to about 1 weight percent of the weight of the host material, In certain embodiments, quantum confined semiconductor nanoparticles are included in an optical material in an amount in a range from about 0.1 to about 0.75 weight percent of the weight of the host material.

In certain embodiments of an optical material further including a host material, quantum confined semiconductor nanoparticles can be included in an optical material in an amount greater than about 5 weight percent of the host material. For example, the optical material can include from about 5 to about 20 weight percent quantum confined semiconductor nanoparticles based on the weight of the host material; the optical material can include from about 5 to about 15 weight percent quantum confined semiconductor nanoparticles based on the weight of the host material, the optical material can include from about 5 to about 10 weight percent quantum confined semiconductor nanoparticles based on the weight of the host material, etc.

Other concentrations of quantum confined semiconductor nanoparticles in an optical material outside of the above ranges may also be determined to be useful or desirable.

In certain embodiments, an optical material further comprises light scatterers.

In certain embodiments, the light scatterers comprise light scattering particles. In certain embodiments, light scattering particles are included in an optical material in an amount in a range from about 0.001 to about 5 weight percent of the weight of the host material. In certain embodiments, light scattering particles are included in an optical material in an amount in a range from about 0.5 to about 3 weight percent of the weight of the host material. In certain embodiments, light scattering particles are included in an optical material in an amount in a range from about 1 to about 3 weight percent of the weight of the host material, In certain embodiments, light scattering particles are included in an optical material in an amount in a range from about 1 to about 2 weight percent of the weight of the host material. In certain embodiments, light scattering particles are included in an optical material in an amount in a range from about 0.1 to about 1 weight percent of the weight of the host material. In certain embodiments, light scattering particles are included in an optical material in an amount in a range from about 0.05 to about 1 weight percent of the weight of the host material.

In certain embodiments, light scattering particles are included in the optical material in an amount greater than about 5 weight percent of the host material. For example, the optical material can include from about 5 to about 20 weight percent light scattering particles based on the weight of the host material; the optical material can include from about 5 to about 15 weight percent light scattering particles based on the weight of the host material, the optical material can include from about 5 to about 10 weight percent light scattering particles based on the weight of the host material, etc.

Other concentrations of light scattering particles in an optical material outside of the above ranges may also be determined to be useful or desirable.

In certain embodiments, an optical component can serve as a cover plate for the solid state lighting device.

In certain embodiments, one or both of the substrates is rigid.

In certain embodiments, one or both of the substrates is flexible.

In certain embodiments, at least one of the substrates can comprises a light diffuser component of a lighting device.

In certain embodiments, an optical material is disposed as one or more layers over a predetermined region of a surface of a substrate.

In certain embodiments, a layer including optical material including a host material has a thickness, for example, from about 0.1 micron to about 1 cm. In certain embodiments, a layer including optical material including a host material has a thickness from about 0.1 to about 200 microns. In certain embodiments, a layer including optical material including a host material has a thickness from about 10 to about 200 microns. In certain embodiments, a layer including optical material including a host material has a thickness from about 30 to about 80 microns. Other thicknesses may be determined to be useful or desirable.

In certain embodiments, quantum confined semiconductor nanoparticles included in an optical material are cadmium free.

In certain embodiments, quantum confined semiconductor nanoparticles included in an optical material comprise a III-V semiconductor material.

In certain embodiments, quantum confined semiconductor nanoparticles included in an optical material comprise a semiconductor nanocrystal including a core comprising a semiconductor material and an inorganic shell disposed on at least a portion of a surface of the core.

An adhesive material included in an optical component described herein is preferably chosen for its optical transmission properties and its adhesion qualities.

In certain preferred embodiments, an adhesive material is optically transparent to at least predetermined wavelengths of light passing into and out of the optical component.

In certain embodiments, an adhesive material is at least 80% optically transparent to at least predetermined wavelengths of light passing into and out of the optical component. In certain embodiments, an adhesive material is at least 85% optically transparent to at least predetermined wavelengths of light passing into and out of the optical component. In certain embodiments, an adhesive material is at least 90% optically transparent to at least predetermined wavelengths of light passing into and out of the optical component. In certain embodiments, an adhesive material is at least 95% optically transparent to at least predetermined wavelengths of light passing into and out of the optical component. In certain embodiments, an adhesive material is at least 99% optically transparent to at least predetermined wavelengths of light passing into and out of the optical component.

In certain preferred embodiments, the adhesive material does not yellow or discolor during sealing. More preferably, the adhesive material does not yellow or discolor during the useful lifetime of the optical component so as to substantially alter the optical properties of the optical component.

In certain preferred embodiments, an adhesive material has adequate adhesive properties to seal the substrates of the optical component together. More preferably, the seal will not partially or fully delaminate or otherwise fail during the useful lifetime of the optical component.

In certain preferred embodiments, the properties of an adhesive material will have minimal impact on the solid state photoluminescent quantum efficiency of an optical material.

In certain preferred embodiments, an adhesive material further has oxygen barrier properties.

In certain preferred embodiments, an adhesive material further has oxygen and moisture barrier properties.

In certain preferred embodiments, an adhesive material can be hardened (e.g., cured or dried) under conditions that are not detrimental to an optical material and the external quantum efficiency of an optical material, Preferably an adhesive material can be UV cured.

In certain preferred embodiments, an adhesive material has a viscosity such that, during formation of the layer, the adhesive material remains as a mound after it has been dispensed on an optical material, with minimal slumping. This viscosity characteristic facilitates achieving an optical component in which the materials between the substrates are substantially free, and preferably free, of air bubbles observable by the naked eye. A preferred adhesive material is a UV curable acrylic urethane. Examples of UV curable acrylic urethanes include products sold by Norland Adhesives called Norland Optical Adhesive 68 and Norland Optical Adhesive 68 T.

In certain embodiments, the adhesive material can comprise a pressure sensitive adhesive.

In certain embodiments, the optical component can further include one or more separate barrier layers. A barrier material is a material that is substantially impervious to oxygen. In certain embodiments, a barrier layer is substantially impervious to oxygen and water. Inclusion of a separate barrier layer over an optical material may be desirable in embodiments that include an adhesive material that does not possess oxygen barrier properties.

Optionally, additional materials can be included in the component. In certain embodiments, such materials can be included as additional layers. In certain embodiments, such materials can be included in an optical material and/or in the layer comprising adhesive material.

In certain embodiments, a layer can include one or more sublayers.

In certain embodiments, the optical component is useful with a light source.

In certain embodiments, an optical material can alter all or a portion of the light output of the light source in at least one spectral regions.

In certain embodiments, an optical material can supplement the light output of the light source in at least one spectral regions.

In certain embodiments, an optical material can alter all or substantially all of the light output of the light source in at least one spectral regions.

In accordance with one aspect of the present invention, there is provided a lighting device comprising a light source, and an optical component described herein that is positioned to receive at least a portion of the light generated by the light source, the optical component comprising the optical component taught herein.

In certain embodiments, the lighting device can include two or more different optical components in a stacked arrangement, at least one of which comprises an optical component in accordance with the invention.

In certain preferred embodiments, the optical component is not in direct contact with the light source.

In certain preferred embodiments, the temperature at the location of the nanoparticles in the light emitting device during operation is 90° C. or less.

In certain preferred embodiments, the lighting device comprises a solid state lighting device that includes a solid state light source. Preferred examples of solid state light sources include semiconductor light emitting diodes (LEDs), which may further optionally include a luminescent color conversion material between the LED and the optical component.

Examples of other light sources described herein can be useful with the lighting device of the invention.

In accordance with another aspect of the present invention, there is provided a lighting fixture adapted to receive one or more light sources, wherein the fixture includes an optical component described herein that is positioned in the fixture relative to the position for the one or more light sources such that at least a portion of the light generated by the light source passes into the optical component before being emitted from the fixture, wherein the optical component comprises an optical component taught herein.

In certain embodiments, the lighting fixture can include two or more different optical components in a stacked arrangement, at least one of which comprises an optical component in accordance with the invention.

In accordance with a further aspect of the present invention, there is provided a cover plate adapted for attachment to a lighting fixture, the cover plate comprising an optical component taught herein.

In accordance with another aspect of the present invention, there is provided a method for preparing an optical component, wherein the method comprises: depositing an optical material comprising quantum confined semiconductor nanoparticles over a predetermined region of a first surface of a first substrate; forming a layer comprising an adhesive material over the optical material and any portion of the first surface of the first substrate that is not covered by the optical material; positioning a second substrate over the layer comprising an adhesive material; and sealing the substrates together.

In certain embodiments, the optical component is formed to include an edge seal area between the perimeter of the optical materials and the edges of the sealed structure wherein the edge seal area includes no optical material. In certain embodiments, the edge seal area can be substantially uniform, and more preferably uniform, around the perimeter of the optical materials.

In certain preferred embodiments, the edge seal areas of each of the substrates are aligned relative to each other in the sealed structure to overlie each other.

In certain preferred embodiments, one or both of such non-smooth substrate surfaces has surface roughness (Ra—arithmetic average profile roughness parameter) greater than 1000 Angstroms.

In certain embodiments, the non-smooth area does not completely cover the substrate or substrates, but is patterned by standard methods (such as masking or selective roughening, etching, texturizing, etc.).

In certain embodiments, one or both of the substrate surfaces between which an optical material and adhesive are disposed are smooth. In certain of such embodiments, at least one, and preferably both of any such smooth substrate surfaces has a water contact angle at an air-substrate interface no greater than 40°, preferably no greater than 25°, and more preferably no greater than 15°.

In certain embodiments, the method for preparing the optical component can comprise depositing optical material comprising quantum confined semiconductor nanoparticles over a plurality of predetermined regions of a first surface of a first substrate; forming a layer comprising an adhesive material over the optical material and any portion of the first surface of the first substrate not covered by the optical material; positioning a second substrate over the layer comprising an adhesive material; sealing the substrates together to form a sealed structure; and separating individual optical components from the sealed structure, wherein an individual optical component corresponds to a portion of the sealed substrate including a predetermined region including optical material.

Separating individual optical components can be accomplished by water jet cutting, scoring, laser-cutting, or other techniques.

In another embodiment, a method for preparing an optical components comprises providing a first substrate including a predetermined region comprising an optical material disposed over a first surface thereat forming a layer comprising an adhesive material over the optical material and any portion of the first surface of the first substrate not covered by the optical material; positioning a second substrate over the layer comprising an adhesive material; and sealing the substrates together In certain embodiments, the method for preparing the optical component can comprise providing a first substrate including plurality of predetermined regions comprising optical material disposed over a first surface of a first substrate; forming a layer comprising an adhesive material over the optical material and any portion of the first surface of the first substrate not covered by the optical material; positioning a second substrate over the layer comprising an adhesive material; sealing the substrates together to form a sealed structure; and separating individual optical components from the sealed structure, wherein an individual optical component corresponds to a portion of the sealed substrate including a predetermined region including optical material.

Separating individual optical components can be accomplished by water jet cutting, scoring, laser-cutting, or other techniques.

In certain embodiments, the individual optical components are formed to include an edge seal area between the perimeter of the optical materials and the edges of the sealed structure wherein the edge seal area includes no optical material. In certain embodiments, the edge seal area can be substantially uniform, and more preferably uniform, around the perimeter of the optical materials.

In certain preferred embodiments, the edge seal areas of each of the substrates are aligned relative to each other in the sealed structure to overlie each other.

In certain embodiments, the second substrate includes a second optical material comprising quantum confined semiconductor nanoparticles disposed over one or more second predetermined regions of the surface thereof that will be internal to the optical component. (See FIG. 4A.) In certain embodiments, the predetermined region comprising the optical material and the second predetermined region comprising the second optical material is the same. In certain embodiments, such regions are aligned to overlie each other in the sealed structure.

In certain embodiments, the optical material and second optical material can comprise an optical material taught herein. In certain embodiments, one or more optical materials can be included as separate layers of a layered arrangement and/or as separate features of a patterned layer.

In certain embodiments, an optical material can be deposited as two or more separate layers.

Optical materials, quantum confined semiconductor nanoparticles, substrates, adhesive materials, and other optional features described herein are also useful in the present method.

In certain embodiments, an optical material including quantum confined semiconductor nanoparticles is deposited as an ink comprising quantum confined semiconductor nanoparticles and a liquid vehicle. In certain preferred embodiments, the liquid vehicle comprises a composition including one or more functional groups that are capable of being cross-linked. The functional units can be cross-linked, for example, by UV treatment, thermal treatment, or another cross-linking technique readily ascertainable by a person of ordinary skill in a relevant art. In certain embodiments, the composition including one or more functional groups that are capable of being cross-linked can be the liquid vehicle itself. In certain embodiments, composition including one or more functional groups that are capable of being cross-linked can be a co-solvent. In certain embodiments, composition including one or more functional groups that are capable of being cross-linked can be a component of a mixture with the liquid vehicle. In certain embodiments, the ink can further include light scatterers.

In certain embodiments in which an optical material is deposited in an ink, the ink is hardened (e.g., by evaporation or drying of solvent, by curing, or other method appropriate based upon the composition of the particular ink) prior to formation of the layer comprising an adhesive material.

In certain embodiments, the ink hardening step can be carried out in air.

In certain embodiments, the ink hardening step is preferably carried out in the absence of air.

In certain embodiments, an optical material further comprises a host material. In certain of such embodiments, the host material can comprise the liquid medium of the ink that is curable. In certain of such embodiments, an optical material is preferably cured prior to the formation of a subsequent layer thereover.

In certain embodiments, the layer comprising an adhesive material is formed by depositing a predetermined amount of adhesive material on the optical material, positioning the second substrate thereover, and applying pressure to the second substrate to spread the adhesive material across the first surface of the first substrate (e.g., over the optical material and any portion of the first surface of the first substrate that is not covered by the optical material) to form a layer. The adhesive material is thereafter hardened to form the optical component.

In fabricating an optical component, the amount of the adhesive material dispensed can be predetermined based upon the size of the area it is intended to cover and the desired thickness of the layer to be formed therefrom. In a preferred embodiment, an amount is used that will form a layer that fully covers the area between the first and second substrates and has a predetermined thickness when the substrates are brought together, with very little extruded from between the substrates. In certain embodiments, the layer has a thickness from about 20 to about 200 microns. Any excess extruded from between the substrates when they are brought together to form the optical component is preferably removed after the layer is hardened. Examples of suitable removal techniques include cutting, sanding, etc. Other suitable techniques can be readily identified by one of ordinary skill in the relevant art.

In certain embodiments, hardening comprises, curing or drying, the adhesive material, depending upon the hardening properties thereof.

In certain preferred embodiments, the layer comprising adhesive material fully covers the area between the substrates.

The foregoing, and other aspects and embodiments described herein all constitute embodiments of the present invention.

Additional information concerning quantum confined semiconductor nanoparticles, light scatterers, host materials, support elements, other features and elements of the foregoing, and other information useful with the present inventions is provided below.

It should be appreciated by those persons having ordinary skill in the art(s) to which the present invention relates that any of the features described herein in respect of any particular aspect and/or embodiment of the present invention can be combined with one or more of any of the other features of any other aspects and/or embodiments of the present invention described herein, with modifications as appropriate to ensure compatibility of the combinations. Such combinations are considered to be part of the present invention contemplated by this disclosure.

It is to be understood that both the foregoing general description and the following detailed description are exemplary and explanatory only and are not restrictive of the invention as claimed. Other embodiments will be apparent to those skilled in the art from consideration of the description and drawings, from the claims, and from practice of the invention disclosed herein.

The attached figures are simplified representations presented for purposes of illustration only; the actual structures may differ in numerous respects, particularly including the relative scale of the articles depicted and aspects thereof.

For a better understanding to the present invention, together with other advantages and capabilities thereof, reference is made to the following disclosure and appended claims in connection with the above-described drawings.

DETAILED DESCRIPTION OF THE INVENTION

Various aspects and embodiments of the present inventions will be further described in the following detailed description.

In accordance with one aspect of the present invention, there is provided an optical component comprising a first substrate, an optical material comprising quantum confined semiconductor nanoparticles disposed over a predetermined region of a first surface of the first substrate, a layer comprising an adhesive material disposed over the optical material and any portion of the first surface of the first substrate not covered by the optical material, and a second substrate disposed over the layer comprising an adhesive material, wherein the first and second substrates are sealed.

Figure 2:
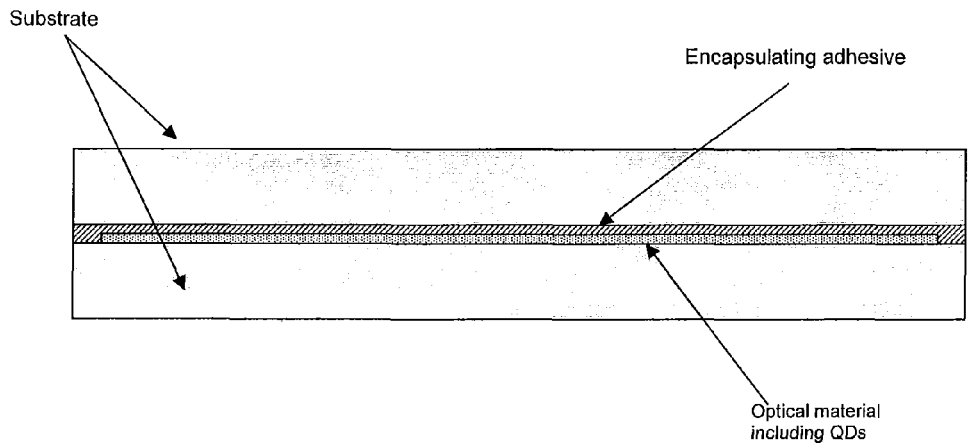
FIG. 2 is a schematic drawing, in cross-section, depicting an example of an embodiment of an optical component in accordance with the invention.

FIG. 2 is a schematic drawing, in cross-section, depicting an example of an embodiment of an optical component in accordance with the invention.

In certain embodiments, the optical component is formed to include an edge seal area between the perimeter of the optical materials and the edges of the sealed structure wherein the edge seal area includes no optical material. In certain embodiments, the edge seal area can be substantially uniform, and more preferably uniform, around the perimeter of the optical materials.

In certain embodiments, the optical component further includes a second optical material comprising quantum confined semiconductor nanoparticles disposed between the layer comprising the adhesive material and the second substrate.

In certain embodiments, the second optical material is disposed over a second predetermined region of a first surface of the second substrate.

In certain embodiments, the first and second optical materials can be included in the optical component in a predetermined arrangement. In certain of such embodiments, the first and second optical materials can be included in predetermined arrangements that are the same as each other (e.g., same size and same arrangement (e.g., same patterned arrangement, if patterned, or same unpatterned arrangement; however, the composition may or may not be the same). In certain embodiments, the predetermined arrangement of the optical material and the second predetermined arrangement of the second optical material are aligned relative to each other to overlie each other in the sealed structure.

Figure 4A:
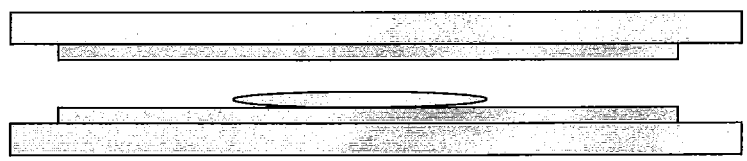
FIG. 4A is a schematic drawing depicting an example of an embodiment of an intermediate step in a method in accordance with the invention for preparing an example of an embodiment of an optical component including an on optical material on a surface of the second substrate.
Figure 4B:
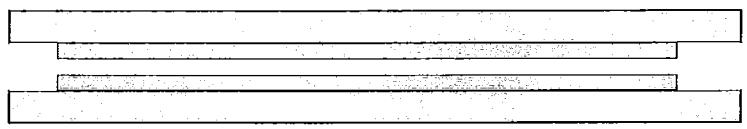
FIG. 4B is a schematic drawing, in cross-section, depicting an example of an embodiment of an optical component including an optical material on the internal surface of each substrate.

An example of an embodiment of an optical component including a second optical material on a surface of the second substrate is shown in cross-section in FIG. 4B. Quantum confined semiconductor nanoparticles can confine electrons and holes and have a photoluminescent property to absorb light and re-emit different wavelength light. Color characteristics of emitted light from quantum confined semiconductor nanoparticles depend on the size of the quantum confined semiconductor nanoparticles and the chemical composition of the quantum confined semiconductor nanoparticles.

Quantum confined semiconductor nanoparticles include at least one type of quantum confined semiconductor nanoparticle with respect to chemical composition, structure, and size. The type(s) of quantum confined semiconductor nanoparticles included in an optical component in accordance with the invention are determined by the wavelength of light to be converted and the wavelengths of the desired light output. As discussed herein, quantum confined semiconductor nanoparticles may or may not include a shell and/or a ligand on a surface thereof. In certain embodiments, a shell and/or ligand can passivate quantum confined semiconductor nanoparticles to prevent agglomeration or aggregation to overcome the Van der Waals binding force between the nanoparticles. In certain embodiments, the ligand can comprise a material having an affinity for any host material in which a quantum confined semiconductor nanoparticle may be included. As discussed herein, in certain embodiments, a shell comprises an inorganic shell.

In certain embodiments, quantum confined semiconductor nanoparticles included in an optical material are cadmium free.

In certain embodiments, quantum confined semiconductor nanoparticles included in an optical material comprise a III-V semiconductor material.

In certain embodiments, quantum confined semiconductor nanoparticles included in an optical material comprise a semiconductor nanocrystal including a core comprising a semiconductor material and an inorganic shell disposed on at least a portion of a surface of the core.

A quantum confined semiconductor nanoparticle may also be referred to herein by the abbreviation "QD".

In certain embodiments, an optical material includes one or more different types of quantum confined semiconductor nanoparticles (based on composition, structure and/or size), wherein each type is selected to obtain light having a predetermined color.

In certain embodiments, optical material can comprise quantum confined semiconductor nanoparticles capable of emitting light in the orange to red spectral (e.g., from about 575 nm to about 650 nm) region.

In certain embodiments, optical material can comprise quantum confined semiconductor nanoparticles capable of emitting light in the red spectral region.

In certain embodiments, optical material can comprise quantum confined semiconductor nanoparticles capable of emitting light in the orange spectral region.

In certain embodiments, optical material can comprise quantum confined semiconductor nanoparticles capable of emitting light in the cyan spectral region.

In certain embodiments, optical material can comprise quantum confined semiconductor nanoparticles capable of emitting light in one or more other predetermined spectral regions.

In certain preferred embodiments, the quantum confined semiconductor nanoparticles included in an optical material have a solution quantum yield, prior to inclusion in an optical material, of at least about 60%, preferably at least about 70%, more preferably at least about 80%, and most preferably at least about 85%.

In certain embodiments, the optical component includes an optical material comprising one or more different types of quantum confined semiconductor nanoparticles (based on composition, structure and/or size or the nanoparticle), wherein each different type of quantum confined semiconductor nanoparticles emits light at predetermined wavelength that can be the same or different from the predetermined wavelength emitted any other type of quantum confined semiconductor nanoparticles included in an optical material. The predetermined wavelengths are selected based on the intended end-use application for an optical component. In certain embodiments including two or more different types of quantum confined semiconductor nanoparticles, at least two of the types are capable of emitting light at a predetermined wavelength that is different from that emitted by at least one other type of quantum confined semiconductor nanoparticles that may be included in the optical component.

In certain embodiments including two or more different types of quantum confined semiconductor nanoparticles that emit at different predetermined wavelengths, the different types of quantum confined semiconductor nanoparticles can be included in one or more different optical materials.

In certain embodiments including two or more different types of quantum confined semiconductor nanoparticles that emit at different predetermined wavelengths, the different types of quantum confined semiconductor nanoparticles can be included in two or more different optical materials.

In certain embodiments including two or more different optical materials, such different optical materials can, for example, be included as separate layers of a layered arrangement and/or as separate features of a patterned layer.

In certain embodiments, for example, the predetermined wavelength can be in a range from about 470 nm to about 650 nm, from about 580 nm to about 630 nm, from about 590 nm to about 630 nm, from about 590 nm to about 630 nm, or from about 600 nm to about 620 nm, from about 600 to about 610, or from about 608 to about 618. Other predetermined wavelengths may be determined to be useful or desirable.

In certain preferred embodiments, quantum confined semiconductor nanoparticles comprise semiconductor nanocrystals.

In certain embodiments, the quantum confined semiconductor nanoparticles in an optical material have a solid state photoluminescent quantum efficiency of at least 40%. In certain embodiments, the quantum confined semiconductor nanoparticles in an optical material have a solid state photoluminescent quantum efficiency of at least 50%. In certain embodiments, the quantum confined semiconductor nanoparticles in an optical material have a solid state photoluminescent quantum efficiency of at least 60%. In certain embodiments, the quantum confined semiconductor nanoparticles in an optical material have a solid state photoluminescent quantum efficiency of at least 70%. In certain embodiments, the quantum confined semiconductor nanoparticles in an optical material have a solid state photoluminescent quantum efficiency of at least 80%. In certain embodiments, the quantum confined semiconductor nanoparticles in an optical material have a solid state photoluminescent quantum efficiency of at least 90%.

In certain preferred embodiments, an optical material comprises quantum confined semiconductor nanoparticles capable of emitting red light. In other certain preferred embodiments, an optical material comprises quantum confined semiconductor nanoparticles capable of emitting light in the orange to red spectral region.

In certain embodiments, an optical material comprises quantum confined semiconductor nanoparticles distributed in a host material.

In certain embodiments, an optical material further comprises a host material in which the quantum confined semiconductor nanoparticles are distributed. In certain embodiments, quantum confined semiconductor nanoparticles are included in an optical material in an amount in a range from about 0.001 to about 5 weight percent of the weight of the host material. In certain embodiments, an optical material includes from about 0.1 to about 3 weight percent quantum confined semiconductor nanoparticles based on the weight of the host material. In certain embodiments, quantum confined semiconductor nanoparticles are included in an optical material in an amount in a range from about 0.5 to about 3 weight percent of the weight of the host material. In certain embodiments, quantum confined semiconductor nanoparticles are included in an optical material in an amount in a range from about 1 to about 3 weight percent of the weight of the host material. In certain embodiments, quantum confined semiconductor nanoparticles are included in an optical material in an amount in a range from about 1 to about 2 weight percent of the weight of the host material. In certain embodiments, quantum confined semiconductor nanoparticles are included in an optical material in an amount in a range from about 0.1 to about 1 weight percent of the weight of the host material. In certain embodiments, quantum confined semiconductor nanoparticles are included in an optical material in an amount in a range from about 0.1 to about 0.75 weight percent of the weight of the host material In certain embodiments of an optical material further including a host material, quantum confined semiconductor nanoparticles can be included in an optical material in an amount greater than about 5 weight percent of the host material. For example, the optical material can include from about 5 to about 20 weight percent quantum confined semiconductor nanoparticles based on the weight of the host material; the optical material can include from about 5 to about 15 weight percent quantum confined semiconductor nanoparticles based on the weight of the host material, the optical material can include from about 5 to about 10 weight percent quantum confined semiconductor nanoparticles based on the weight of the host material, etc.

Other concentrations of quantum confined semiconductor nanoparticles in an optical material outside of the above ranges may also be determined to be useful or desirable.

Preferably, the host material comprises a solid host material. Examples of a host material useful in various embodiments and aspect of the inventions described herein include polymers, monomers, resins, binders, glasses, metal oxides, and other nonpolymeric materials. Preferred host materials include polymeric and non-polymeric materials that are optically transparent to predetermined wavelengths of light.

In certain embodiments, a host material is at least 90% optically transparent to at least predetermined wavelengths of light passing into and out of the optical component. In certain embodiments, a host material is at least 95% optically transparent to at least predetermined wavelengths of light passing into and out of the optical component. In certain embodiments, a host material is at least 99% optically transparent to at least predetermined wavelengths of light passing into and out of the optical component.

In certain embodiments, the predetermined wavelengths can include wavelengths of light in the visible (e.g., 400-700 nm) region of the electromagnetic spectrum.

Preferred host materials include cross-linked polymers and solvent-cast polymers. Examples of preferred host materials include, but are not limited to, glass or resin that is optically transparent to at least predetermined wavelengths of light. In particular, a resin such as a non-curable resin, heat-curable resin, or photocurable resin is suitably used from the viewpoint of processability. As specific examples of such a resin, in the form of either an oligomer or a polymer, a melamine resin, a phenol resin, an alkyl resin, an epoxy resin, a polyurethane resin, a maleic resin, a polyamide resin, polymethyl methacrylate, polyacrylate, polycarbonate, polyvinyl alcohol, polyvinylpyrrolidone, hydroxyethylcellulose, carboxymethylcellulose, copolymers containing monomers forming these resins, and the like. Other suitable host materials can be identified by persons of ordinary skill in the relevant art.

In certain embodiments and aspects of the inventions contemplated by this disclosure, a host material comprises a photocurable resin. A photocurable resin may be a preferred host material in certain embodiments, e.g., embodiments in which the composition is to be patterned. As a photo-curable resin, a photo-polymerizable resin such as an acrylic acid or methacrylic acid based resin containing a reactive vinyl group, a photo-crosslinkable resin which generally contains a photo-sensitizer, such as polyvinyl cinnamate, benzophenone, or the like may be used. A heat-curable resin may be used when the photo-sensitizer is not used. These resins may be used individually or in combination of two or more.

In certain embodiments and aspects of the inventions contemplated by this disclosure, a host material comprises a solvent-cast resin. A polymer such as a polyurethane resin, a maleic resin, a polyamide resin, polymethyl methacrylate, polyacrylate, polycarbonate, polyvinyl alcohol, Polyvinylpyrrolidone, hydroxyethylcellulose, carboxymethylcellulose, copolymers containing monomers forming these resins, and the like can be dissolved in solvents known to those skilled in the art. Upon evaporation of the solvent, the resin forms a solid host material for the semiconductor nanoparticles.

In certain embodiments, light scatterers are included in an optical material. In certain embodiments, the light scatterers comprise light scattering particles. In certain embodiments, light scattering particles are included in an optical material in an amount in a range from about 0.001 to about 5 weight percent of the weight of the host material. In certain embodiments, light scattering particles are included in an optical material in an amount in a range from about 0.5 to about 3 weight percent of the weight of the host material. In certain embodiments, light scattering particles are included in an optical material in an amount in a range from about 1 to about 3 weight percent of the weight of the host material. In certain embodiments, light scattering particles are included in an optical material in an amount in a range from about 1 to about 2 weight percent of the weight of the host material. In certain embodiments, light scattering particles are included in an optical material in an amount in a range from about 0.05 to about 1 weight percent of the weight of the host material.

In certain embodiments, light scattering particles are included in the optical material in an amount greater than about 5 weight percent of the host material. For example, the optical material can include from about 5 to about 20 weight percent light scattering particles based on the weight of the host material; the optical material can include from about 5 to about 15 weight percent light scattering particles based on the weight of the host material, the optical material can include from about 5 to about 10 weight percent light scattering particles based on the weight of the host material, etc.

Other concentrations of light scattering particles in an optical material outside of the above ranges may also be determined to be useful or desirable.

In certain embodiments, the weight ratio of quantum confined semiconductor nanoparticles to scatterers is from about 1:100 to about 100:1.

Examples of light scatterers (also referred to herein as scatterers or light scattering particles) that can be used in the embodiments and aspects of the inventions described herein, include, without limitation, metal or metal oxide particles, air bubbles, and glass and polymeric beads (solid or hollow). Other light scatterers can be readily identified by those of ordinary skill in the art. In certain embodiments, scatterers have a spherical shape. Preferred examples of scattering particles include, but are not limited to, $TiO_2$, $SiO_2$, $BaTiO_3$, $BaSO_4$, and ZnO. Particles of other materials that are non-reactive with the host material and that can increase the absorption pathlength of the excitation light in the host material can be used. In certain embodiments, light scatterers may have a high index of refraction (e.g., $TiO_2$, $BaSO_4$, etc) or a low index of refraction (gas bubbles). In certain preferred embodiments, a light scatterer is not luminescent.

Selection of the size and size distribution of the scatterers is readily determinable by those of ordinary skill in the art. The size and size distribution can be based upon the refractive index mismatch of the scattering particle and the host material in which it the light scatterer is to be dispersed, and the preselected wavelength(s) to be scattered according to Rayleigh scattering theory. The surface of the scattering particle may further be treated to improve dispersability and stability in the host material. In one embodiment, the scattering particle comprises $TiO_2$ (R902+ from DuPont) having a median particle size 0.405 micron, in a concentration in a range from about 0.001 to about 5% by weight. In certain preferred embodiments, the concentration range of the scatterers is between 0.05% and 2% by weight.

In certain embodiments, an optical material including quantum confined semiconductor nanoparticles and a host material can be formed from an ink comprising quantum confined semiconductor nanoparticles and a liquid vehicle, wherein the liquid vehicle comprises a composition including one or more functional groups that are capable of being cross-linked. The functional units can be cross-linked, for example, by UV treatment, thermal treatment, or another cross-linking technique readily ascertainable by a person of ordinary skill in a relevant art. In certain embodiments, the composition including one or more functional groups that are capable of being cross-linked can be the liquid vehicle itself. In certain embodiments, it can be a co-solvent. In certain embodiments, it can be a component of a mixture with the liquid vehicle. In certain embodiments, the ink can further include light scatterers. Other additives and/or components that can be included in an optical material can further be included in the ink.

In certain preferred embodiments of the inventions contemplated by this disclosure, quantum confined semiconductor nanoparticles (e.g., semiconductor nanocrystals) are distributed within an optical material as individual particles.

In certain embodiments, an optical material includes other additives (e.g., wetting or leveling agents) can also be included in optical material.

In certain aspects and embodiments of the inventions taught herein, the optical component includes a first optically transparent substrate and a second optically transparent substrate.

In certain embodiments, one or both of the substrates is at least 80% optically transparent to at least predetermined wavelengths of light passing into and out of the optical component. In certain embodiments, one or both of the substrates is at least 85% optically transparent to at least predetermined wavelengths of light passing into and out of the optical component. In certain embodiments, one or both of the substrates is at least 90% optically transparent to at least predetermined wavelengths of light passing into and out of the optical component. In certain embodiments, one or both of the substrates is at least 95% optically transparent to at least predetermined wavelengths of light passing into and out of the optical component. In certain embodiments, one or both of the substrates is at least 99% optically transparent to at least predetermined wavelengths of light passing into and out of the optical component.

In certain embodiments one or both of the substrates can comprise a rigid material, e.g., glass, polycarbonate, acrylic, quartz, sapphire, or other known rigid materials.

In certain embodiments, one or both of the substrates can comprise a flexible material, e.g., a polymeric material such as plastic (e.g. but not limited to thin acrylic, epoxy, polycarbonate, PEN, PET, PE) or a silicone.

In certain embodiments, one or both of the substrates can comprise a flexible material including a silica or glass coating thereon. Preferably the silica or glass coating is sufficiently thin to retain the flexible nature of the base flexible material.

In certain embodiments, the substrates are the same.

In certain embodiments, each of the substrates can be different.

In certain embodiments, one or both of the substrates can include a transmission haze (as defined in ASTM D1003-0095) in a range from about 0.1% to about 5%. (ASTM D1003-0095 is hereby incorporated herein by reference.) In certain embodiments, one or both of the major surfaces of one or both of the substrates is smooth.

In certain embodiments, at least one, and preferably both of the substrate surfaces between which an optical material and adhesive layer disposed are non-smooth. In certain of such embodiments, one or both of such substrate surfaces are textured. In certain of such embodiments, one or both of such substrate surfaces are roughened. In certain of such embodiments, one or both of such substrate surfaces are etched.

In certain preferred embodiments, one or both of such non-smooth substrate surfaces has surface roughness (Ra—arithmetic average profile roughness parameter) greater than 1000 Angstroms.

In certain embodiments, the non-smooth area does not completely cover the substrate or substrates, but is patterned by standard methods (such as masking or selective roughening, etching, texturizing, etc.).

In certain embodiments, one or both major surfaces of one or both of the substrates can be corrugated.

In certain embodiments, one or both major surfaces of one or both of the substrates can be roughened.

In certain embodiments, one or both major surfaces of one or both of the substrates can be textured.

In certain embodiments, one or both major surfaces of one or both of the substrates can be concave.

In certain embodiments, one or both major surfaces of one or both of the substrates can be convex.

In certain embodiments, one major surface of at least one of the substrates can comprise microlenses.

In certain embodiments, the thickness of one or both of the substrates is substantially uniform.

In certain embodiments, one or both of the substrate surfaces between which an optical material and adhesive are disposed are smooth. In certain of such embodiments, at least one, and preferably both of any such smooth substrate surfaces has a water contact angle at an air-substrate interface no greater than 40°, preferably no greater than 25°, and more preferably no greater than 15°.

In certain embodiments, the geometrical shape and dimensions of the first substrate and second substrate are selected based on the particular end-use application (e.g., lamp, solid state lighting device, lighting fixture, or other apparatus or device).

In certain embodiments, an optical component includes at least one layer including one or more optical materials comprising quantum confined semiconductor nanoparticles.

In certain embodiments including more than one type of quantum confined semiconductor nanoparticles, each type can be included in a separate layer.

In certain embodiments, an optical material is disposed across a major surface of a substrate.

In certain embodiments, the optical material is disposed as an uninterrupted layer across a major surface of a substrate.

As described herein, in certain embodiments, an optical material can be disposed in predetermined arrangement which can be patterned or unpatterned.

In certain embodiments, an optical material is disposed as one or more luminescent layers over a predetermined region of a surface of the substrate.

In certain embodiments, a layer including optical material including a host material has a thickness, for example, from about 0.1 micron to about 1 cm. In certain embodiments, a layer including optical material including a host material has a thickness from about 0.1 to about 200 microns. In certain embodiments, a layer including optical material including a host material has a thickness from about 10 to about 200 microns. In certain embodiments, a layer including optical material including a host material has a thickness from about 30 to about 80 microns. Other thicknesses may be determined to be useful or desirable.

In certain embodiments, other optional layers may also be included.

In certain embodiments, a layer can include two or more layers.

While further including a filter may be undesirable for energy considerations, there may be instances in which a filter is included for other reasons. In such instances, a filter may be included. In certain embodiments, a filter may cover all or at least a predetermined portion of the support element. In certain embodiments, a filter can be included for blocking the passage of one or more predetermined wavelengths of light. A filter layer can be included over or under an optical material. In certain embodiments, an optical component can include multiple filter layers on various surfaces of the support element. In certain embodiments, a notch filter layer can be included.

In certain embodiments, one or more anti-reflection coatings can be included in the optical component.

In certain embodiments, one or more wavelength selective reflective coatings can be included in the optical component. Such coatings can, for example, reflect light back toward the light source.

In certain embodiments, for example, an optical component may further include outcoupling members or structures across at least a portion of a surface thereof. In certain embodiments, outcoupling members or structures may be uniformly distributed across a surface. In certain embodiments, outcoupling members or structures may vary in shape, size, and/or frequency in order to achieve a more uniform light distribution outcoupled from the surface. In certain embodiments, outcoupling members or structures may be positive, e.g., sitting or projecting above the surface of optical component, or negative, e.g., depressions in the surface of the optical component, or a combination of both.

In certain embodiments, an optical component can further include a lens, prismatic surface, grating, etc. on the surface thereof from which light is emitted. Other coatings can also optionally be included on such surface.

In certain embodiments, outcoupling members or structures can be formed by molding, embossing, lamination, applying a curable formulation (formed, for example, by techniques including, but not limited to, spraying, lithography, printing (screen, inkjet, flexography, etc), etc.).

In certain embodiments, one or both substrates can include light scatterers.

In certain embodiments, one or both substrates can include air bubbles or air gaps.

In certain embodiments, an optical component can include one or more major, surfaces with a flat or matte finish.

In certain embodiments, an optical component can include one or more surfaces with a gloss finish.

In certain aspects and embodiments of the inventions taught herein, an optical component can optionally further include a cover, coating or layer on all or a portion of the outer surface of the component for protection from the environment (e.g., dust, moisture, and the like) and/or scratching or abrasion.

An adhesive material is preferably chosen for its optical transmission properties and its adhesion qualities.

In certain preferred embodiments, an adhesive material is optically transparent to at least predetermined wavelengths of light passing into and out of the optical component.

In certain embodiments, an adhesive material is at least 80% optically transparent to at least predetermined wavelengths of light passing into and out of the optical component. In certain embodiments, an adhesive material is at least 85% optically transparent to at least predetermined wavelengths of light passing into and out of the optical component. In certain embodiments, an adhesive material is at least 90% optically transparent to at least predetermined wavelengths of light passing into and out of the optical component. In certain embodiments, an adhesive material is at least 95% optically transparent to at least predetermined wavelengths of light passing into and out of the optical component. In certain embodiments, an adhesive material is at least 99% optically transparent to at least predetermined wavelengths of light passing into and out of the optical component.

In certain preferred embodiments, the adhesive material does not yellow or discolor during sealing. More preferably, the adhesive material does not yellow or discolor during the useful lifetime of the optical component so as to substantially alter the optical properties of the optical component.

In certain preferred embodiments, an adhesive material has adequate adhesive properties to seal the optical component together. More preferably, the seal will not partially or fully delaminate or otherwise fail during the useful lifetime of the optical component.

In certain preferred embodiments, the properties of an adhesive material will have minimal impact on the solid state photoluminescent quantum efficiency of an optical material.

In certain preferred embodiments, an adhesive material further has oxygen barrier properties.

In certain preferred embodiments, an adhesive material further has oxygen and moisture barrier properties.

In certain preferred embodiments, an adhesive material can be hardened (e.g., cured or dried) under conditions that are not detrimental to an optical material and the external quantum efficiency of an optical material. Preferably an adhesive material can be UV cured.

Preferably, an adhesive material has a viscosity such that, during formation of the layer, the adhesive material remains as a mound after it has been dispensed on the optical material, with minimal slumping. This viscosity characteristic facilitates achieving an optical component in which the materials between the substrates are substantially free, and preferably free, of air bubbles observable by the naked eye. A preferred adhesive material is a UV curable acrylic urethane. Examples of UV curable acrylic urethanes include a products sold by Norland Adhesives called Norland Optical Adhesive 68 and Norland Optical Adhesive 68 T.

In certain embodiments, the adhesive material can comprise a pressure sensitive adhesive. Additional suitable adhesive materials (e.g., epoxies, acrylics, urethanes, other UV curable acrylics, etc.) can be readily ascertained by one of ordinary skill in the relevant art.

In certain embodiments, the optical component can further include one or more separate barrier layers. For example, a separate barrier layer can be applied to a surface of a substrate before an optical material is deposited, and/or a separate barrier layer can be applied over an optical material before it comes into contract with the adhesive material. A barrier material is a material that is substantially impervious to oxygen. In certain embodiments, a barrier layer is substantially impervious to oxygen and water.

Example of suitable barrier films or coatings include, without limitation, a hard metal oxide coating, a thin glass layer, and Barix coating materials available from Vitex Systems, Inc. Other barrier films or coating can be readily ascertained by one of ordinary skill in the art.

In certain embodiments, more than one barrier film or coating can be used to further encapsulate optical material(s) between the substrates.

In certain preferred embodiments, a barrier material is optically transparent to at least light having predetermined wavelengths of light passing into and out of the optical component. In certain embodiments, a barrier material is at least 80% optically transparent to at least predetermined wavelengths of light passing into and out of the optical component. In certain embodiments, a barrier material is at least 85% optically transparent to at least predetermined wavelengths of light passing into and out of the optical component. In certain embodiments, a barrier material is at least 90% optically transparent to at least predetermined wavelengths of light passing into and out of the optical component. In certain embodiments, a barrier material is at least 95% optically transparent to at least predetermined wavelengths of light passing into and out of the optical component. In certain embodiments, a barrier material is at least 99% optically transparent to at least predetermined wavelengths of light passing into and out of the optical component.

In certain preferred embodiments, a barrier material does not yellow or discolor so as substantially alter the optical properties of the optical component.

In certain preferred embodiments, a barrier material not partially or fully delaminate during the useful lifetime of the optical component.

In certain preferred embodiments, the properties of a barrier material will have minimal impact on the external quantum efficiency of an optical material.

In certain preferred embodiments, a barrier material can formed under conditions that are not detrimental to an optical material and the external quantum efficiency of an optical material.

In certain embodiments, the optical component is useful with a light source.

In certain embodiments, an optical material can alter all or a portion of the light output of the light source in at least one spectral regions.

In certain embodiments, an optical material can supplement the light output of the light source in at least one spectral regions.

In certain embodiments, an optical material can alter all or substantially all of the light output of the light source in at least one spectral regions.

A light source preferably emits in the visible region of the electromagnetic spectrum.

Examples of light sources include, for example, but not limited to, light sources that produce a light output including at least one spectral component in the blue spectral region (e.g., about 400 to about 500 nm, about 400 to about 475 nm, etc.).

In certain embodiments, the light source is selected to emit white light.

In certain embodiments, the light source is selected to emit off-white light.

In certain embodiments, an white light emitting LED comprises a blue light emitting semiconductor LED including a phosphor or other luminescent material(s) for converting the blue LED light output to white light.

In certain embodiments, an off-white light emitting LED comprises a blue light emitting semiconductor LED including a phosphor or other luminescent material(s) for converting the blue LED light output to off-white light.

In certain embodiments, for example, a blue light emitting LED component included in the white light emitting LED comprises, e.g., (In)GaN blue.

In certain embodiments, a blue LED can emit light in a range from about 400 nm to about 500 nm. In certain embodiments, a blue LED can emit light in a range from about 400 nm to about 475 nm.

In certain embodiments, the LED comprises a UV light emitting semiconductor LED including a phosphor or other luminescent material(s) for converting the UV LED light output to white or off-white.

In certain embodiments, optical material can comprise quantum confined semiconductor nanoparticles capable of emitting light in the blue to red spectral (e.g., from about 470 nm to about 650 nm) region. In certain embodiments, optical material can comprise quantum confined semiconductor nanoparticles capable of emitting light in the red spectral region. In certain embodiments, optical material can comprise quantum confined semiconductor nanoparticles capable of emitting light in the cyan spectral region. In certain embodiments, optical material can comprise quantum confined semiconductor nanoparticles capable of emitting light in the orange spectral region. In certain embodiments, optical material can comprise quantum confined semiconductor nanoparticles capable of emitting light in one or more other spectral regions in which the light source has a deficiency.

In certain embodiments in which the optical component is intended for use with a light source that produces a light output including light emission in the blue spectral region, the optical component can convert at least 10% of the emission in the blue spectral region to one or more predetermined wavelengths. In certain of such embodiments, the optical component can convert at least 30% of the emission in the blue spectral region to one or more predetermined wavelengths. In certain of such embodiments, the optical component can convert at least 60% of the emission in the blue spectral region to one or more predetermined wavelengths. In certain of such embodiments, the optical component can convert at least 90% of the emission in the blue spectral region to one or more predetermined wavelengths.

In certain embodiments in which the optical component is intended for use with a light source that produces a light output including light emission in the blue spectral region, the optical component can convert from about 50% to about 75% of the emission in the blue spectral region to one or more predetermined wavelengths.

Advantageously, in certain embodiments of the present invention, an optical material comprising red-emitting quantum confined semiconductor nanoparticles can compensate for the red spectral deficiency while also lowering the correlated color temperature of a white light emitting LED. Such optical material can alter the light output from the light source such that the General Color Rendering Index ($R_a$) of the light output from the device is increased compared to that of light emitted directly from the light source. Such optical material can alter the light output from the light source such that the correlated color temperature of the light output from the device has a lower correlated color temperature than that of the light emitted directly from the light source.

In certain embodiments, an optical component can serve as a cover plate for a lighting device.

In certain embodiments, the substrate comprises a light diffuser component of a lighting device.

As described herein, in another aspect of the present invention, there is provided a lighting device comprising one or more light sources capable of generating light, and an optical component positioned to receive at least a portion of the light generated by at least one of the one or more light sources and convert at least a portion of the light so received to one or more predetermined wavelengths such that the light emitted by the solid state lighting device includes light emission from the light source supplemented with light emission at one or more predetermined wavelengths, wherein the optical component comprises an optical component taught herein.

In certain embodiments, a lighting device can include a plurality of light sources.

In certain embodiments including a plurality of light sources, the individual light sources can be the same or different.

In certain embodiments including a plurality of light sources, each individual light sources can emit light having a wavelength that is the same as or different from that emitted by each of the other light sources.

In certain embodiments including a plurality of light sources, the individual light sources can be arranged as an array within the device.

Light sources described herein can be included in a light device of the invention. Other light sources can also be suitable for use. Other suitable light sources can be readily ascertained by one of ordinary skill in the relevant art.

In certain embodiments, an optical material can supplement the light output of the light source in at least one spectral regions.

In certain embodiments, by supplementing the light output of the light source in at least one spectral region, an optical component can also increase the General Color Rendering Index ($R_a$) of light output from the light source.

General Color Rendering Index (which can be abbreviated as $R_a$), as used herein refers to the common definition of color rendering index as a mean value for 8 standard color samples ($R_{1-8}$).

For example, in certain embodiments, the optical component can increase the General Color Rendering Index ($R_a$) of light output from the light source by at least 10%. In certain embodiments, the General Color Rendering Index ($R_a$) is increased to a predetermined General Color Rendering Index ($R_a$).

In certain embodiments, for example, an optical component can alter light emitted by a light source with a General Color Rendering Index ($R_a$) less than 80 to greater than 80, greater than 85, greater than 90, or greater than 95.

In certain embodiments, for example, an optical component can alter light emitted by a light source.

In certain embodiments, an optical component can alter white light output to have an R9 value that is a positive number. More preferably, the R9 value is at least 50. Most preferably, the R9 value is greater than 80.

In certain embodiments, by supplementing the light output of the light source in at least one spectral region, an optical component can alter the correlated color temperature (CCT) of light output from the light source. In certain embodiments, the optical component can lower the correlated color temperature of light output from the light source by, for example, at least about 1000K; at least about 2000K, at least 3000K, at least 4000K, etc.

In certain embodiments, the CCT is altered to a predetermined CCT.

In certain embodiments, an optical material is not in direct contact with the light source.

In certain embodiments, the optical component is not in direct contact with the light source.

Preferably the temperature at the location of the nanoparticles during operation of the solid state lighting device is less than 90° C., less than 75° C., 60° C. or less, 50° C. or less, 40° C. or less. In certain preferred embodiments, the temperature at the location of the nanoparticles during operation of the solid state lighting device is in a range from about 30° C. to about 60° C.

In certain embodiments of a lighting device in accordance with the invention that include, e.g., a light source comprising a white light emitting LED and an optical component comprising an optical material comprising quantum confined semiconductor nanoparticles that can emit light in the orange to red spectral region, an emission in the orange to red spectral region is added to the light output of the solid state lighting device. The addition of the nanoparticles with a predetermined emission wavelength in the spectral range from about 470 nm to about 650 nm can improve the lumens per watt efficiency of the solid state lighting device without increasing the power requirements thereof.

In certain embodiments, a lighting device comprises a light source comprising an LED capable of emitting white light including emission in the blue spectral region and having a deficiency in the red spectral region; and an optical component that is positioned to receive light emitted by the LED, the optical component comprising an optical material for converting at least a portion of the emission in the blue spectral region to light in the red spectral region with a wavelength in a range from about 600 nm to about 620 nm such that light emitted by the solid state lighting device includes white light emission from the LED light source supplemented with light emission in the red spectral region, wherein an optical material comprises quantum confined semiconductor nanoparticles.

In certain embodiments, a lighting device comprises a light source comprising an LED capable of emitting white light including emission in the blue spectral region and having a deficiency in the orange to red spectral region; and an optical component that is positioned to receive light emitted by the LED, the optical component comprising an optical material for converting at least a portion of the emission in the blue spectral region to light in the spectral region from about 575 nm to about 650 nm such that light emitted by the solid state lighting device includes white light emission from the LED light source supplemented with light emission in the spectral region from about 575 nm to about 650 nm, wherein an optical material comprises quantum confined semiconductor nanoparticles. In certain embodiments, for example, an optical material can convert at least a portion of the blue spectral emission to light in the spectral region from about 575 nm to about 650 nm, from about 580 to about 630 nm, from about 590 nm to about 630 nm, from about 600 nm to about 620 nm, etc. In certain embodiments, the wavelength can be from about 600 to about 610. In certain embodiments, the wavelength can be from about 608 to about 618.

In certain embodiments, at least 10% of the emission in the blue spectral region is converted by the quantum confined semiconductor nanoparticles.

In certain embodiments, at least 30% of the emission in the blue spectral region is converted by the quantum confined semiconductor nanoparticles.

In certain embodiments, at least 60% of the emission in the blue spectral region is converted by the quantum confined semiconductor nanoparticles.

In certain embodiments, at least 90% of the emission in the blue spectral region is converted by the quantum confined semiconductor nanoparticles.

In certain embodiments, from about 50% to about 75% of the emission in the blue spectral region is converted by the quantum confined semiconductor nanoparticles.

In accordance with another aspect of the present invention, there is provided a lighting fixture adapted to receive one or more light sources, wherein the fixture includes an optical component that is positioned in the fixture relative to the position of at least one of the one or more light sources such that at least a portion of the light generated by at least one of the light sources passes into the optical component before being emitted from the fixture, wherein the optical component comprises an optical component taught herein.

In accordance with a further aspect of the present invention, there is provided a cover plate adapted for attachment to a lighting device or a lighting fixture for a light source, the cover plate comprising an optical component taught herein, and means for attaching the cover plate to the device or lighting fixture, wherein the optical component can modify the light output of the light emitting device with which it is used.

In certain embodiments, the optical component can further comprise one or more features and optionally additional materials and/or layers described herein.

In certain embodiments and aspects of the inventions described herein, the geometrical shape and dimensions of the optical component can be selected based on the particular end-use application.

In certain embodiments, the light device or lighting fixture includes a solid state light source (e.g., an LED).

In accordance with another aspect of the invention, there is provided a method for making an optical component, wherein the method comprises: depositing an optical material comprising quantum confined semiconductor nanoparticles over a predetermined region of a first surface of a first substrate; forming a layer comprising an adhesive material over the optical material and any portion of the first surface of the first substrate that is not covered by the optical material; positioning a second substrate over the layer comprising an adhesive material; and sealing the substrates together.

In accordance with another embodiment of the method, there is provided a method for preparing a plurality of optical components comprising depositing optical material comprising quantum confined semiconductor nanoparticles over a plurality of predetermined regions of a first surface of a first substrate; forming a layer comprising an adhesive material over the optical material and any portion of the first surface of the first substrate that is not covered by the optical material; positioning a second substrate over the layer comprising an adhesive material; sealing the substrates together to form a sealed structure; and separating individual optical components from the sealed structure, wherein an individual optical component corresponds to a portion of the sealed substrate including a predetermined region including optical material.

Separating individual optical components can be accomplished by water jet cutting, scoring, laser-cutting, or other techniques.

In certain embodiments, the second substrate includes a second optical material comprising quantum confined semiconductor nanoparticles in a second predetermined arrangements disposed over a second predetermined region of the surface thereof that will be internal to the optical component. (See FIG. 4A.) In certain embodiments, the predetermined arrangement of the optical material and the second predetermined arrangement of the second optical material can the same, as discussed above.

In certain embodiments, an optical material comprises an optical material taught herein. In certain embodiments, one or more optical materials can be included as separate layers of a layered arrangement and/or as separate features of a patterned layer.

Optical materials, quantum confined semiconductor nanoparticles, substrates, adhesive material, and other optional features described herein are also useful in the present method.

Figure 1:
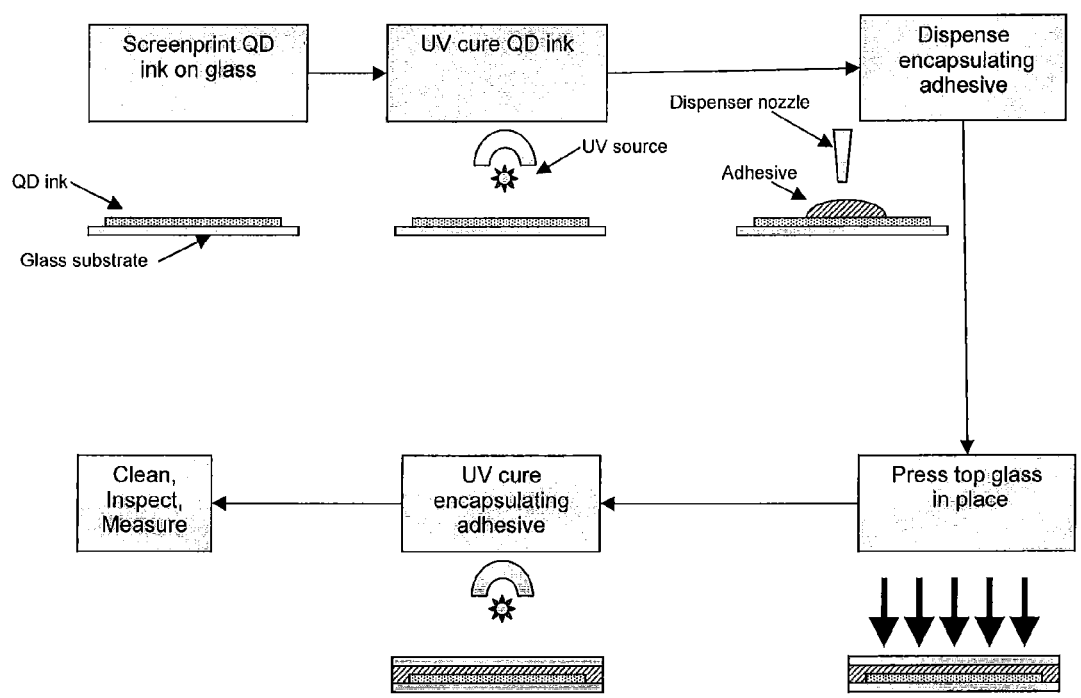
FIG. 1 is a schematic drawing depicting an example of an outline of a flow diagram of an embodiment of a method in accordance with the invention.

An example of an embodiment of the method is outlined in FIG. 1. In the example outlined in FIG. 1, optical material is deposited as a UV curable ink including quantum confined semiconductor nanoparticles. In the depicted example, the ink is screen-printed or stencil printed in a predetermined pattern onto a first substrate (e.g., a glass plate). In certain preferred embodiments, the first substrate comprises glass, but other suitable substrates can also be used. In certain embodiments, the ink can alternatively be printed by other techniques known to those familiar in the relevant art. The ink is printed to a predetermined thickness. Such predetermined thickness is selected based on the concentration of quantum confined semiconductor nanoparticles (e.g., semiconductor nanocrystals) in the ink and the amount of light scatterers present in the ink (which are optional), and the intended end-use of the optical component (e.g., the characteristics of light to be supplemented by optical material(s) included in the optical component and the desired color point of the light after passing through the optical component).

In certain embodiments, the ink is printed in air. Printing in air can facilitate ease of manufacture.

In certain embodiments, the ink is printed in a controlled (e.g., air free) environment. Once printed, the ink is hardened by a mechanism based upon the liquid medium included in the ink. For example, in embodiments in which the liquid component of the ink is a curable resin, the ink is hardened by curing the ink resin. In certain preferred embodiments, the ink resin is UV curable and exposure to a UV light source for a sufficient length of time will cure the ink. For example, an ink including a UV curable acrylic resin can be cured by exposure to a Dymax Fusion H-bulb at 30-45 milliwatts/cm$^2$ for 20 seconds.

In certain embodiments, the ink hardening step can be carried out in air.

In certain embodiments, the ink is hardened in a controlled (e.g., air free) environment.

Next, an amount of optically clear adhesive material (shown in the figure as a preferred encapsulating adhesive) is dispensed upon the cured optical material.

Preferably, an adhesive material has a viscosity such that, during formation of the layer, the adhesive material remains as a mound after it has been dispensed on the optical material, with minimal slumping. This viscosity characteristic facilitates achieving an optical component in which the materials between the substrates are substantially free, and preferably free, of air bubbles observable by the naked eye. A preferred adhesive material is a UV curable acrylic urethane. Examples of UV curable acrylic urethanes include a products sold by Norland Adhesives called Norland Optical Adhesive 68 and Norland Optical Adhesive 68 T.

In certain embodiments, the adhesive material can comprise a pressure sensitive adhesive.

The second substrate (e.g., a glass plate) is brought down in a controlled fashion to touch the top of the dispensed adhesive material (shown in the figure as a preferred encapsulating adhesive). Preferably the adhesive material has oxygen barrier properties. The second substrate is then slowly pushed downwards while maintaining parallelism to the bottom glass substrate. This compressive force can be applied actively, for example with a controlled force apparatus (screw, hydraulic, pneumatic, etc). This compressive force can also be applied passively, for example with a weight. Preferably the compressive force is substantially uniform across the component. The compressive force can be adjusted to control the thickness of the adhesive material.

In certain embodiments, a compressive force no greater than 80 lbf (10.6 psi) is used, In certain embodiments, a compressive force no greater than 20 lbf (approximately 2.6 psi) is used. Other compressive forces may be determined to be useful or desirable.

Preferably, the force is held for about one minute before the force is removed. Other times may be determined to be useful or desirable.

The adhesive is thereafter hardened to seal the device.

In certain embodiments including a UV curable adhesive, the total UV energy during the curing is preferably less than 5000 mJ/cm$^2$.

In certain embodiments including a UV curable adhesive, low shrinkage adhesive can be used to minimize shrinkage stress, or curing conditions can be used that will minimize shrinkage stress. These conditions are known to those who are familiar with the art, and can include lower intensity UV radiation over a longer time. In certain embodiments, the surface of the second substrate to be internal to the optical component further includes a second optical material comprising quantum confined semiconductor nanoparticles in a second predetermined arrangement. In certain embodiments, the second optical material is disposed over a second predetermined region of the internal surface of the second substrate to face the first substrate in a predetermined arrangement. In certain embodiments, predetermined arrangement of the second optical material is a mirror image of the predetermined arrangement of optical material(s) disposed over the first substrate and is aligned to be superimposed over the predetermined arrangement of optical material(s) disposed over the surface of the first substrate. In embodiments including a second optical material on the second substrate, a compressive force no greater than 20 lbf (approximately 2.6 psi) is preferred.

Other compressive forces may be determined to be useful or desirable.

An optical component produced by the example of an embodiment of the method shown in FIG. 1 includes a film of optical material including quantum confined semiconductor nanoparticles that is completely encapsulated from the atmosphere by the adhesive material.

FIG. 2 is a schematic drawing, in cross-section, depicting an example of an embodiment of an optical component in accordance with the invention.

Even though the package is assembled in air, oxygen is excluded for the most part because there are substantially no air pockets in the completed optical component. An optical material is surrounded by the adhesive material on three sides, and by glass on the fourth side.

In order to permeate the optical component after it is sealed, oxygen must diffuse through the end seal and into an optical material layer. Barrier properties of the package can also be controlled by the length of the edge seal (e.g., the distance from the edge of the substrate to the outer edge of the layer of optical material between the substrates).

In certain embodiments, the length of the edge seal is substantially uniform around the perimeter of the substrates. As an example, the edge seal length is no less than 0.5 mm in certain embodiments. In certain embodiments the edge seal can be 1 mm. In certain embodiments, the edge seal can be 2 mm. In certain embodiments, the edge seal can be 3 mm or greater. Other edge seal lengths may also be determined to be useful or desirable.

In certain preferred aspects and embodiments of the inventions taught herein, the sealed optical component is exposed to light flux for a period of time sufficient to increase the photoluminescent efficiency of an optical material.

In certain embodiments, the optical component is exposed to light and heat for a period of time sufficient to increase the photoluminescent efficiency of an optical material. In certain embodiments, the exposure to light or light and heat is continued for a period of time until the photoluminescent efficiency reaches a substantially constant value. In certain embodiments, a light source including light output with emission in the range of 365 to 480 nm is used as the source of light flux. In certain embodiments, a light source including light output with emission in the range of 365 to 470 nm is used as the source of light flux.

In certain preferred embodiments, blue LEDs or blue emitting fluorescent lamps are used. Other known light sources with emissions in such wavelength range can be readily identified by the skilled artisan. In certain embodiments, the light flux is from about 10 to about 100 mW/cm$^2$, preferably from about 20 to about 35 mW/cm$^2$, and more preferably from about 20 to about 30 mW/cm$^2$. In embodiments that include exposing an optical material to light and heat, an optical material is exposed to light while at a temperature in a range from about 25° to about 80° C. In certain embodiments, after sealing, an optical component is exposed to light from a blue LED emitting light at a 450 nm nominal center wavelength at a temperature of 80° C. in air. In certain embodiments, after sealing, an optical component is exposed to light from a blue LED emitting light at a 450 nm nominal center wavelength at a temperature of 50° C. in air.

For additional information that may be useful with the present invention, see U.S. Patent Application No. 61/175,456, of Linton, et al., for "Optical Material, Optical Component, Devices, And Methods", filed 4 May 2009, which is hereby incorporated herein by reference.

Figure 5:
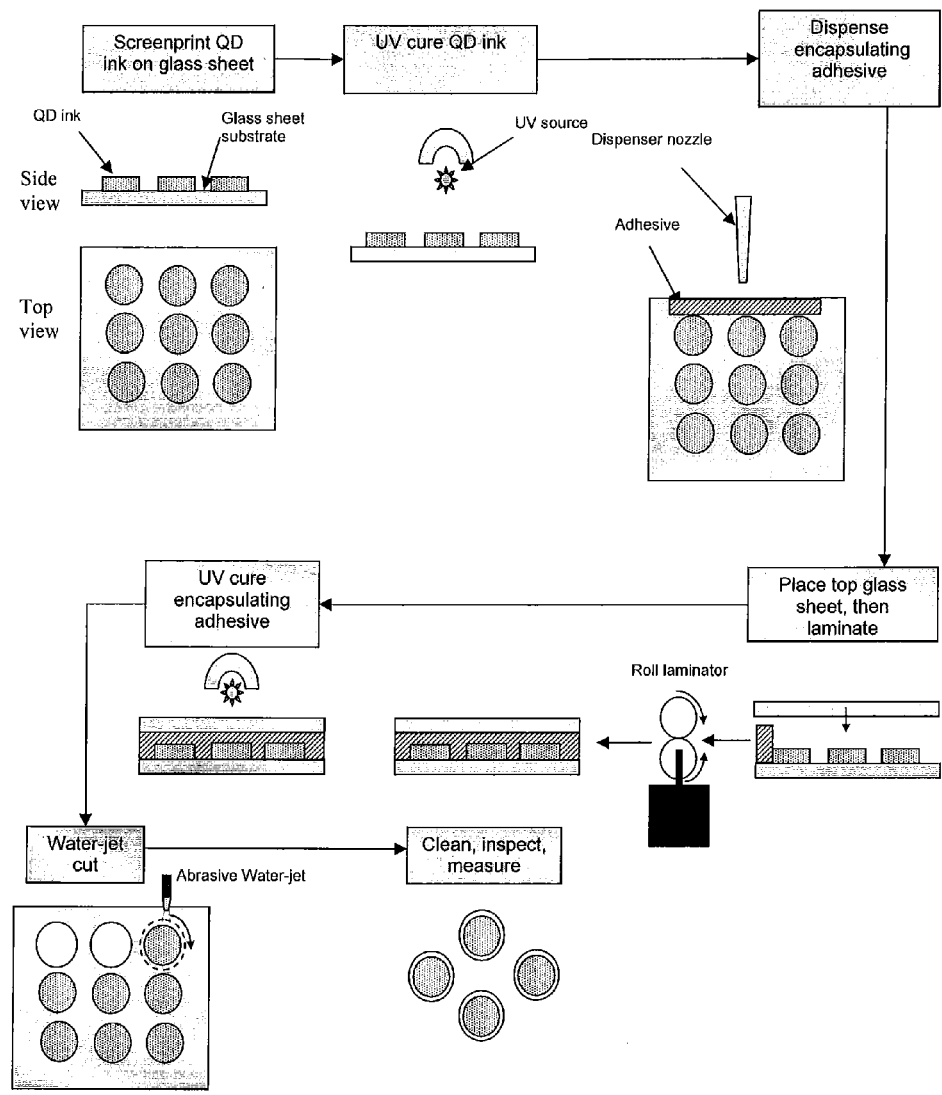
FIG. 5 a schematic drawing depicting an example of a flow diagram of an embodiment of a method in accordance with the invention.

An example of an embodiment of a method for making a plurality of optical components is outlined in FIG. 5. In the example outlined in FIG. 5, optical material is deposited as a UV curable ink including quantum confined semiconductor nanoparticles over a plurality of predetermined regions on a first substrate. In the depicted example, the ink is screen-printed or stencil printed in a predetermined pattern onto a first substrate (e.g., a glass plate). In certain preferred embodiments, the first substrate comprises glass, but other suitable substrates can also be used.

In certain embodiments, at least one, and preferably both of the substrate surfaces between which an optical material and adhesive layer disposed are non-smooth. In certain of such embodiments, one or both of such substrate surfaces are textured. In certain of such embodiments, one or both of such substrate surfaces are roughened. In certain of such embodiments, one or both of such substrate surfaces are etched.

In certain preferred embodiments, one or both of such non-smooth substrate surfaces has surface roughness (Ra— arithmetic average profile roughness parameter) greater than 1000 Angstroms.

In certain embodiments, the non-smooth area does not completely cover the substrate or substrates, but is patterned by standard methods (such as masking or selective roughening, etching, texturizing, etc.).

In certain embodiments, one or both of the substrate surfaces between which an optical material and adhesive are disposed are smooth. In certain of such embodiments, at least one, and preferably both of any such smooth substrate surfaces has a water contact angle at an air-substrate interface no greater than 40°, preferably no greater than 25° more preferably no greater than 15°.

In certain embodiments, the ink can alternatively be printed by other techniques known to those familiar in the relevant art. The ink is printed to a predetermined thickness. Such predetermined thickness is selected based on the concentration of quantum confined semiconductor nanoparticles (e.g., semiconductor nanocrystals) in the ink and the amount of light scatterers present in the ink (which are optional), and the intended end-use of the optical component (e.g., the characteristics of light to be supplemented by optical material(s) included in the optical component and the desired color point of the light after passing through the optical component).

In certain embodiments, the ink is printed in air. Printing in air can facilitate ease of manufacture.

In certain embodiments, the ink is printed in a controlled (e.g., air free) environment.

Once printed, the ink is hardened by a mechanism based upon the liquid medium included in the ink. For example, in embodiments in which the liquid component of the ink is a curable resin, the ink is hardened by curing the ink resin. In certain preferred embodiments, the ink resin is UV curable and exposure to a UV light source for a sufficient length of time will cure the ink. For example, an ink including a UV curable acrylic resin can be cured by exposure to a Dymax Fusion H-bulb at 30-45 milliwatts/cm² for 20 seconds.

In certain embodiments, the ink hardening step can be carried out in air.

In certain embodiments, the ink is hardened in a controlled (e.g., air free) environment.

Next, an amount of optically clear adhesive material (shown in the figure as a preferred encapsulating adhesive) is dispensed onto the first substrate. In the depicted example, a stripe of adhesive is dispensed across the surface of the substrate including the cured optical material, near an edge. The amount of adhesive is preferably at least sufficient to provide a uniform layer of adhesive over the surface of the substrate including the hardened optical material, having a predetermined thickness. The adhesive can alternatively be deposited by other techniques and/or arrangements for attaining a uniform layer of adhesive over the surface of the substrate including the hardened optical material, having a predetermined thickness.

Preferably, an adhesive material has a viscosity such that, during formation of the layer, the adhesive material remains as a mound after it has been dispensed on the optical material, with minimal slumping. This viscosity characteristic facilitates achieving an optical component in which the materials between the substrates are substantially free, and preferably free, of air bubbles observable by the naked eye. A preferred adhesive material is a UV curable acrylic urethane. Examples of UV curable acrylic urethanes include a products sold by Norland Adhesives called Norland Optical Adhesive 68 and Norland Optical Adhesive 68 T.

In certain embodiments, the adhesive material can comprise a pressure sensitive adhesive. The second substrate (e.g., a glass plate) is brought down in a controlled fashion to touch the top of the line of dispensed adhesive material and compressive force is applied to the stacked arrangement to compress the structure and spread the adhesive across the surface of the first substrate including the cured ink.

Roll-lamination can be used as depicted in the example. Other techniques known to those familiar in the relevant art can alternatively be used to form the layer of adhesive between the two substrates and seal the structure. Preferably the substrates are parallel after sealing.

As discussed above, preferably the adhesive material has oxygen barrier properties.

The second substrate is then slowly pushed downwards while maintaining parallelism to the bottom glass substrate. Preferably compressive force is applied in a substantially uniform manner across the structure. The compressive force can be adjusted to control the thickness of the adhesive material. In certain embodiments, a compressive force no greater than 80 lbf (10.6 psi) is used. In certain embodiments, a compressive force no greater than 20 lbf (approximately 2.6 psi) is used. Other compressive forces may be determined to be useful or desirable.

The adhesive is thereafter hardened to seal the device.

In certain embodiments including a UV curable adhesive, the total UV energy during the curing is preferably less than 5000 mJ/cm².

In certain embodiments including a UV curable adhesive, low shrinkage adhesive can be used to minimize shrinkage stress, or curing conditions can be used that will minimize shrinkage stress. These conditions are known to those who are familiar with the art, and can include lower intensity UV radiation over a longer time. After the substrates are sealed, individual optical components are separated from the sealed structure. An individual optical component can correspond to a portion of the sealed substrate including a predetermined region including optical material. Preferably an individual optical components includes a margin of adhesive between the perimeter of the optical material and the edge of the optical component. More preferably, the margin is uniform.

Separating individual optical components can be accomplished by water jet cutting, scoring, laser-cutting, or other techniques.

In certain embodiments, at least one, and preferably both of the substrate surfaces between which an optical material is disposed are non-smooth.

In certain of such embodiments, one or both of such substrate surfaces are textured. In certain of such embodiments, one or both of such substrate surfaces are roughened.

In certain embodiments, at least one, and preferably both of the substrate surfaces between which an optical material and adhesive layer disposed are non-smooth. In certain of such embodiments, one or both of such substrate surfaces are textured. In certain of such embodiments, one or both of such substrate surfaces are roughened. In certain of such embodiments, one or both of such substrate surfaces are etched.

In certain preferred embodiments, one or both of such non-smooth substrate surfaces has surface roughness (Ra—arithmetic average profile roughness parameter) greater than 1000 Angstroms.

In certain embodiments, the non-smooth area does not completely cover the substrate or substrates, but is patterned by standard methods (such as masking or selective roughening, etching, texturizing, etc.).

In certain embodiments, one or both of the substrate surfaces between which an optical material and adhesive are disposed are smooth. In certain of such embodiments, at least one, and preferably both of any such smooth substrate surfaces has a water contact angle at an air-substrate interface no greater than 40°, preferably no greater than 25° more preferably no greater than 15°.

In certain embodiments, at least one, and preferably both of the substrate surfaces between which an optical material is disposed has a contact angle no greater than 30°, preferably no greater than 20° more preferably no greater than 10°.

In certain embodiments, the surface of the second substrate to be internal to the optical component can further include a second optical material comprising quantum confined semiconductor nanoparticles disposed over a second plurality of predetermined regions over a first surface of the second substrate. In certain embodiments, the plurality of predetermined regions on the first and second substrate are aligned so as to be superimposed over each other when the substrates are sealed.

In embodiments including predetermined regions of first and second optical materials on the respective substrates, such regions can have the same size and same shape.

An individual optical components prepared by this embodiment can further include an edge seal area between the perimeter of the predetermined regions comprising the optical material and the edges of the sealed structure, wherein the edge seal area includes no optical material.

In certain preferred aspects and embodiments of the inventions taught herein, the sealed optical component is exposed to light flux for a period of time sufficient to increase the photoluminescent efficiency of an optical material, as described above.

An optical component produced by the example of an embodiment of the method shown in FIG. 5 includes a film of optical material including quantum confined semiconductor nanoparticles that is completely encapsulated from the atmosphere by the adhesive material.

Even when a portion of the assembly process, e.g., prior to hardening the ink, is be carried out in air in accordance with certain embodiments of the invention, oxygen is excluded for the most part because there are substantially no air pockets in the completed optical component. An optical material is surrounded by the adhesive material on three sides, and by glass on the fourth side.

In order to permeate the optical component after it is sealed, oxygen must diffuse through the end seal and into an optical material layer. Barrier properties of the package can also be controlled by the length of the edge seal (e.g., the distance from the edge of the substrate to the outer edge of the layer of optical material between the substrates).

In certain embodiments, the length of the edge seal is substantially uniform around the perimeter of the substrates.

As an example, the edge seal length is no less than 0.5 mm in certain embodiments. in certain embodiments the edge seal can be 1 mm. In certain embodiments, the edge seal can be 2 mm. In certain embodiments, the edge seal can be 3 mm or greater. Other edge seal lengths may also be determined to be useful or desirable.

In certain embodiments, at least one, and preferably both of the substrate surfaces between which an optical material and adhesive layer disposed are non-smooth. In certain of such embodiments, one or both of such substrate surfaces are textured. In certain of such embodiments, one or both of such substrate surfaces are roughened. In certain of such embodiments, one or both of such substrate surfaces are etched.

In certain preferred embodiments, one or both of such non-smooth substrate surfaces has surface roughness (Ra—arithmetic average profile roughness parameter) greater than 1000 Angstroms.

In certain embodiments, the non-smooth area does not completely cover the substrate or substrates, but is patterned by standard methods (such as masking or selective roughening, etching, texturizing, etc.).

In certain embodiments, one or both of the substrate surfaces between which an optical material and adhesive are disposed are smooth. In certain of such embodiments, at least one, and preferably both of any such smooth substrate surfaces has a water contact angle at an air-substrate interface no greater than 40°, preferably no greater than 25° more preferably no greater than 15°.

Photoluminescent efficiency can be measured, for example, with use of a spectrophotometer in an integrating sphere including a NIST traceable calibrated light source.

Figure 3:
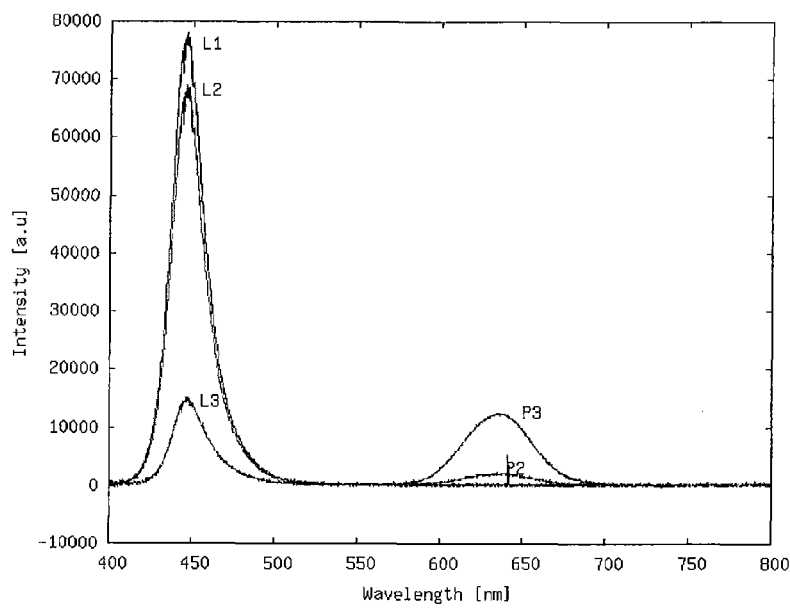
FIG. 3 depicts spectra to illustrate a method for measuring quantum efficiency.

For example, External Quantum Efficiency (EQE) can be measured in a 12" integrating sphere using a NIST traceable calibrated light source, using the method developed by Mello et al., Advanced Materials 9(3):230 (1997), which is hereby incorporated by reference. The method uses a collimated 450 nm LED source, an integrating sphere and a spectrometer. Three measurements are taken. First, the LED directly illuminates the integrating sphere giving a spectrum labeled L1 and shown in FIG. 3 (which graphically represents emission intensity (a.u.) as a function of wavelength (nm)) for purposes of example in describing this method. Next, the PL sample is placed into the integrating sphere so that only diffuse LED light illuminates the sample giving the (L2+P2) spectrum shown for purposes of example in FIG. 3. Finally, the PL sample is placed into the integrating sphere so that the LED directly illuminates the sample (just off normal incidence) giving the (L3+P3) spectrum shown for purposes of example 4. After collecting the data, each spectral contribution (L's and P's) is computed. L1, L2 and L3 correspond to the sums of the LED spectra for each measurement and P2 and P3 are the sums associated with the PL spectra for 2nd and 3rd measurements. The following equation then gives the external PL quantum efficiency:

$$EQE = [(P3 \cdot L2) \mathrm{minus} (P2 \cdot L3)]/(L1 \cdot (L2 \mathrm{\ minus\ } L3))$$

In certain embodiments, an optical material can further include light scattering particles and other optional additives described herein.

Because semiconductor nanocrystals have narrow emission linewidths, are photoluminescent efficient, and emission wavelength tunable with the size and/or composition of the nanocrystals, they are preferred quantum confined semiconductor nanoparticles for use in the various aspects and embodiments of the inventions described herein.

The size and composition of quantum confined semiconductor nanoparticles (including, e.g., semiconductor nanocrystals) useful in the various aspects and embodiments of the inventions can be selected such that semiconductor nanocrystals emit photons at a predetermined wavelength of wavelength band in the far-visible, visible, infra-red or other desired portion of the spectrum. For example, the wavelength can be between 300 and 2,500 nm or greater, such as between 300 and 400 nm, between 400 and 700 nm, between 700 and 1100 nm, between 1100 and 2500 nm, or greater than 2500 nm.

Quantum confined semiconductor nanoparticles (including, e.g., semiconductor nanoctystals) are nanometer-scale inorganic semiconductor nanoparticles. Semiconductor nanocrystals include, for example, inorganic crystallites between about 1 nm and about 1000 nm in diameter, preferably between about 2 nm and about 50 nm, more preferably about 1 nm to about 20 nm (such as about 6, 7, 8, 9, 10, 11, 12, 13, 14, 15, 16, 17, 18, 19, or 20 nm).

Semiconductor nanocrystals included in various aspect and embodiments of the inventions most preferably have an average nanocrystal diameter less than about 150 Angstroms (Å). In certain embodiments, semiconductor nanocrystals having an average nanocrystal diameter in a range from about 12 to about 150 Angstroms can be particularly desirable.

However, depending upon the composition and desired emission wavelength of the semiconductor nanocrystal, the average diameter may be outside of these various preferred size ranges.

The semiconductor forming the nanoparticles and nanoctystals for use in the various aspects and embodiments of the inventions described herein can comprise Group IV elements, Group II-VI compounds, Group II-V compounds, Group III-VI compounds, Group III-V compounds, Group IV-VI compounds, Group I-III-VI compounds, Group II-IV-VI compounds, or Group II-IV-V compounds, for example, CdS, CdO, CdSe, CdTe, ZnS, ZnO, ZnSe, ZnTe, MgTe, GaAs, GaP, GaSb, GaN, HgS, HgO, HgSe, HgTe, InAs, InP, InSb, InN, AlAs, AlP, AlSb, AlS, PbS, PbO, PbSe, Ge, Si, alloys thereof, and/or mixtures thereof, including ternary and quaternary mixtures and/or alloys.

Examples of the shape of the nanoparticles and nanoctystals include sphere, rod, disk, other shape or mixtures thereof.

In certain preferred aspects and embodiments of the inventions, quantum confined semiconductor nanoparticles (including, e.g., semiconductor nanoctystals) include a "core" of one or more first semiconductor materials, which may include an overcoating or "shell" of a second semiconductor material on at least a portion of a surface of the core. In certain embodiments, the shell surrounds the core. A quantum confined semiconductor nanoparticle (including, e.g., semiconductor nanocrystal) core including a shell on at least a portion of a surface of the core is also referred to as a "core/shelf" semiconductor nanocrystal.

For example, a quantum confined semiconductor nanoparticle (including, e.g., semiconductor nanocrystal) can include a core comprising a Group IV element or a compound represented by the formula MX, where M is cadmium, zinc, magnesium, mercury, aluminum, gallium, indium, thallium, or mixtures thereof, and X is oxygen, sulfur, selenium, tellurium, nitrogen, phosphorus, arsenic, antimony, or mixtures thereof. Examples of materials suitable for use as a core include, but are not limited to, CdS, CdO, CdSe, CdTe, ZnS, ZnO, ZnSe, ZnTe, MgTe, GaAs, GaP, GaSb, GaN, HgS, HgO, HgSe, HgTe, InAs, InP, InSb, InN, AlAs, AlP, AlSb, AlS, PbS, PbO, PbSe, Ge, Si, alloys thereof, and/or mixtures thereof, including ternary and quaternary mixtures and/or alloys. Examples of materials suitable for use as a shell include, but are not limited to, CdS, CdO, CdSe, CdTe, ZnS, ZnO, ZnSe, ZnTe, MgTe, GaAs, GaP, GaSb, GaN, HgS, HgO, HgSe, HgTe, InAs, InP, InSb, InN, AlAs, AlP, AlSb, AlS, PbS, PbO, PbSe, Ge, Si, alloys thereof, and/or mixtures thereof, including ternary and quaternary mixtures and/or alloys.

In certain embodiments, the surrounding "shell" material can have a bandgap greater than the bandgap of the core material and can be chosen so as to have an atomic spacing close to that of the "core" substrate. In another embodiment, the surrounding shell material can have a bandgap less than the bandgap of the core material. In a further embodiment, the shell and core materials can have the same crystal structure. Shell materials are discussed further below. For further examples of core/shell semiconductor structures, see U.S. application Ser. No. 10/638,546, entitled "Semiconductor Nanocrystal Heterostructures", filed 12 Aug. 2003, which is hereby incorporated herein by reference in its entirety.

Quantum confined semiconductor nanoparticles are preferably members of a population of semiconductor nanoparticles having a narrow size distribution. More preferably, the quantum confined semiconductor nanoparticles (including, e.g., semiconductor nanocrystals) comprise a monodisperse or substantially monodisperse population of nanoparticles.

Quantum confined semiconductor nanoparticles show strong quantum confinement effects that can be harnessed in designing bottom-up chemical approaches to create optical properties that are tunable with the size and composition of the nanoparticles.

For example, preparation and manipulation of semiconductor nanocrystals are described in Murray et al. (J. Am. Chem. Soc., 115:8706 (1993)); in the thesis of Christopher Murray, "Synthesis and Characterization of II-VI Quantum Dots and Their Assembly into 3-D Quantum Dot Superlattices", Massachusetts Institute of Technology, September, 1995; and in U.S. patent application Ser. No. 08/969,302 entitled "Highly Luminescent Color-selective Materials" which are hereby incorporated herein by reference in their entireties. Other examples of the preparation and manipulation of semiconductor nanocrystals are described in U.S. Pat. Nos. 6,322,901 and 6,576,291, and U.S. Patent Application No. 60/550,314, each of which is hereby incorporated herein by reference in its entirety.

Other materials, techniques, methods, applications, and information that may be useful with the present invention are described in: U.S. Application No 61/162,293, filed 21 Mar. 2009, U.S. Application No 61/173,375 filed 28 Apr. 2009, U.S. Application No. 61/175,430 filed 4 May 2009, U.S. Patent Application No. 61/175,456, filed 4 May 2009, U.S. Patent Application No. 61/234,179, filed 14 Aug. 2009, International Patent Application No. PCT/US2009/002789, filed 6 May 2009; and U.S. patent application Ser. No. 12/283,609, filed 12 Sep. 2008, U.S. patent application Ser. No. 12/283,609 of Seth Coe-Sullivan et al. for "Compositions, Optical Component, System Including An Optical Components, Devices, And Other Products", filed 12 Sep. 2008 International Application No. PCT/US2008/10651, of Breen, et al., for "Functionalized Nanoparticles And Method", filed 12

Sep. 2008, and International Application No. PCT/US2009/002796 of Seth Coe-Sullivan et al. for "Optical Components, Systems Including an Optical Component, And Devices", filed 6 May 2009, and U.S. Patent Application No. 61/252,656 of Breen for "Method For Preparing Quantum Dots", filed 17 Oct. 2009. Each of the foregoing is hereby incorporated by reference herein in its entirety.

In various aspects and embodiments of the invention, quantum confined semiconductor nanoparticles (including, but not limited to, semiconductor nanocrystals) optionally have ligands attached thereto.

In certain embodiments, the ligands are derived from the coordinating solvent used during the growth process. The surface can be modified by repeated exposure to an excess of a competing coordinating group to form an overlayer. For example, a dispersion of the capped semiconductor nanocrystal can be treated with a coordinating organic compound, such as pyridine, to produce crystallites which disperse readily in pyridine, methanol, and aromatics but no longer disperse in aliphatic solvents. Such a surface exchange process can be carried out with any compound capable of coordinating to or bonding with the outer surface of the semiconductor nanocrystal, including, for example, phosphines, thiols, amines and phosphates. The semiconductor nanocrystal can be exposed to short chain polymers which exhibit an affinity for the surface and which terminate in a moiety having an affinity for a suspension or dispersion medium. Such affinity improves the stability of the suspension and discourages flocculation of the semiconductor nanocrystal. In other embodiments, semiconductor nanocrystals can alternatively be prepared with use of non-coordinating solvent(s).

Examples of typical coordinating solvents include, but are not limited to, alkyl phosphines, alkyl phosphine oxides, alkyl phosphonic acids, or alkyl phosphinic acids, however, other coordinating solvents, such as pyridines, furans, and amines may also be suitable for the nanocrystal production. Examples of other suitable coordinating solvents include pyridine, tri-n-octyl phosphine (TOP), tri-n-octyl phosphine oxide (TOPO) and tris-hydroxylpropylphosphine (tHPP). Technical grade TOPO can be used. 3,5-di-tert-butyl-4-hydroxybenzylphosphonic acid can also be used as a ligand.

For example, a coordinating ligand can have the formula:

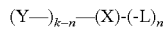

wherein k is 2, 3 or 5, and n is 1, 2, 3, 4 or 5 such that k–n is not less than zero; X is O, S, S=O, SO2, Se, Se=O, N, N=O, P, P=O, As, or As=O; each of Y and L, independently, is aryl, heteroatyl, or a straight or branched C2-12 hydrocarbon chain optionally containing at least one double bond, at least one triple bond, or at least one double bond and one triple bond. The hydrocarbon chain can be optionally substituted with one or more C1-4 alkyl, C2-4 alkenyl, C2-4 alkynyl, C1-4 alkoxy, hydroxyl, halo, amino, nitro, cyano, C3-5 cycloalkyl, 3-5 membered heterocycloalkyl, aryl, heteroatyl, C1-4 alkylcarbonyloxy, C1-4 alkyloxycarbonyl, C1-4 alkylcarbonyl, or formyl. The hydrocarbon chain can also be optionally interrupted by —O—, —S—, —N(Ra)-, —N(Ra)-C(O)—O—, —O—C(O)—N(Ra)-, —N(Ra)-C(O)—N(Rb)-, —O—C(O)—O—, —P(Ra)-, or —P(O)(Ra)-. Each of Ra and Rb, independently, is hydrogen, alkyl, alkenyl, alkynyl, alkoxy, hydroxylalkyl, hydroxyl, or haloalkyl. An aryl group is a substituted or unsubstituted cyclic aromatic group. Examples include phenyl, benzyl, naphthyl, tolyl, anthracyl, nitrophenyl, or halophenyl. A heteroaryl group is an aryl group with one or more heteroatoms in the ring, for instance furyl, pyridyl, pyrrolyl, phenanthryl.

A suitable coordinating ligand can be purchased commercially or prepared by ordinary synthetic organic techniques, for example, as described in J. March, Advanced Organic Chemistry, which is incorporated herein by reference in its entirety.

See also U.S. patent application Ser. No. 10/641,292 entitled "Stabilized Semiconductor Nanocrystals", filed 15 Aug. 2003, which is hereby incorporated herein by reference in its entirety.

When an electron and hole localize on a quantum confined semiconductor nanoparticle (including, but not limited to, a semiconductor nanocrystal), emission can occur at an emission wavelength. The emission has a frequency that corresponds to the band gap of the quantum confined semiconductor material. The band gap is a function of the size of the nanoparticle. Quantum confined semiconductor nanoparticles having small diameters can have properties intermediate between molecular and bulk forms of matter. For example, quantum confined semiconductor nanoparticles having small diameters can exhibit quantum confinement of both the electron and hole in all three dimensions, which leads to an increase in the effective band gap of the material with decreasing crystallite size. Consequently, for example, both the optical absorption and emission of semiconductor nanocrystals shift to the blue, or to higher energies, as the size of the crystallites decreases.

For an example of blue light-emitting semiconductor nanocrystal materials, see U.S. patent application Ser. No. 11/071,244, filed 4 Mar. 2005, which is hereby incorporated by reference herein in its entirety.

The emission from a quantum confined semiconductor nanoparticle can be a narrow Gaussian emission band that can be tuned through the complete wavelength range of the ultraviolet, visible, or infra-red regions of the spectrum by varying the size of the quantum confined semiconductor nanoparticle, the composition of the quantum confined semiconductor nanoparticle, or both. For example, CdSe can be tuned in the visible region and InAs can be tuned in the infra-red region. The narrow size distribution of a population of quantum confined semiconductor nanoparticles can result in emission of light in a narrow spectral range. The population can be monodisperse preferably exhibits less than a 15% rms (root-mean-square) deviation in diameter of the quantum confined semiconductor nanoparticles, more preferably less than 10%, most preferably less than 5%. Spectral emissions in a narrow range of no greater than about 75 nm, preferably 60 nm, more preferably 40 nm, and most preferably 30 nm full width at half max (FWHM) for quantum confined semiconductor nanoparticles that emit in the visible can be observed. IR-emitting quantum confined semiconductor nanoparticles can have a FWHM of no greater than 150 nm, or no greater than 100 nm. Expressed in terms of the energy of the emission, the emission can have a FWHM of no greater than 0.05 eV, or no greater than 0.03 eV. The breadth of the emission decreases as the dispersity of quantum confined semiconductor nanoparticle diameters decreases.

For example, semiconductor nanocrystals can have high emission quantum efficiencies such as greater than 10%, 20%, 30%, 40%, 50%, 60%, 70%, 80%, or 90%.

The narrow FWHM of semiconductor nanocrystals can result in saturated color emission. The broadly tunable, saturated color emission over the entire visible spectrum of a single material system is unmatched by any class of organic chromophores (see, for example, Dabbousi et al., J. Phys. Chem. 101, 9463 (1997), which is incorporated by reference in its entirety). A monodisperse population of semiconductor nanocrystals will emit light spanning a narrow range of wavelengths. A pattern including more than one size of semiconductor nanocrystal can emit light in more than one narrow range of wavelengths, The color of emitted light perceived by a viewer can be controlled by selecting appropriate combinations of semiconductor nanocrystal sizes and materials. The degeneracy of the band edge energy levels of semiconductor nanocrystals facilitates capture and radiative recombination of all possible excitons.

Transmission electron microscopy (TEM) can provide information about the size, shape, and distribution of the semiconductor nanocrystal population. Powder X-ray diffraction (XRD) patterns can provide the most complete information regarding the type and quality of the crystal structure of the semiconductor nanocrystals. Estimates of size are also possible since particle diameter is inversely related, via the X-ray coherence length, to the peak width. For example, the diameter of the semiconductor nanocrystal can be measured directly by transmission electron microscopy or estimated from X-ray diffraction data using, for example, the Scherrer equation. It also can be estimated from the UV/Vis absorption spectrum.

Quantum confined semiconductor nanoparticles are preferably handled in a controlled (oxygen-free and moisture-free) environment, preventing the quenching of luminescent efficiency during the fabrication process.

An optical material comprising quantum confined semiconductor nanoparticles can be dispersed in a liquid medium and are therefore compatible with thin-film deposition techniques such as spin-casting, drop-casting, and dip coating.

In certain preferred embodiments, an optical material for use in various aspects and embodiments in accordance with the invention can be prepared, for example, from an ink comprising quantum confined semiconductor nanoparticles and a liquid vehicle, wherein the liquid vehicle comprises one or more functional groups that are capable of being polymerized (e.g., cross-linked) to form a host material. In certain embodiments, the functional units can be cross-linked by UV treatment. In certain embodiments, the functional units can be cross-linked by thermal treatment. In certain embodiments, the functional units can be cross-linked by other cross-linking technique readily ascertainable by a person of ordinary skill in a relevant art. In certain embodiments, an optical material including one or more functional groups that are capable of being cross-linked can be the liquid vehicle itself, Optionally, the ink further includes scatterers and/or other additives.

An ink can be deposited onto a surface of a substrate by printing, screen-printing, spin-coating, gravure techniques, inkjet printing, roll printing, etc. The ink can be deposited in a predetermined arrangement. For example, the ink can be deposited in a patterned or unpatterned arrangement. For additional information that may be useful to deposit an ink onto a substrate, see for example, International Patent Application No. PCT/US2007/014711, entitled "Methods For Depositing Nanomaterial, Methods For Fabricating A Device, And Methods For Fabricating An Array Of Devices", of Seth A. Coe-Sullivan, filed 25 Jun. 2007, International Patent Application No. PCT/US2007/014705, entitled "Methods For Depositing Nanomaterial, Methods For Fabricating A Device, Methods For Fabricating An Array Of Devices And Compositions", of Seth A. Coe-Sullivan, et al., filed 25 Jun. 2007, International Patent Application No. PCT/US2007/014706, entitled "Methods And Articles Including Nanomaterial", of Seth A. Coe-Sullivan, et al., filed 25 Jun. 2007, International Patent Application No. PCT/US2007/08873, entitled "Composition Including Material, Methods Of Depositing Material, Articles Including Same And Systems For Depositing Material", of Seth A. Coe-Sullivan, et al., filed 9 Apr. 2007, International Patent Application No. PCT/US2007/09255, entitled "Methods Of Depositing Material, Methods Of Making A Device, And Systems And Articles For Use In Depositing Material", of Maria J, Anc, et al., filed 13 Apr. 2007, International Patent Application No. PCT/US2007/08705, entitled "Methods And Articles Including Nanomaterial", of Seth Coe-Sullivan, et al, filed 9 Apr. 2007, International Patent Application No. PCT/US2007/08721, entitled "Methods Of Depositing Nanomaterial & Methods Of Making A Device" of Marshall Cox, et al., filed 9 Apr. 2007, U.S. patent application Ser. No. 11/253,612, entitled "Method And System For Transferring A Patterned Material" of Seth Coe-Sullivan, et al., filed 20 Oct. 2005, and U.S. patent application Ser. No. 11/253,595, entitled "Light Emitting Device Including Semiconductor Nanocrystals", of Seth Coe-Sullivan, et al., filed 20 Oct. 2005, each of the foregoing patent applications being hereby incorporated herein by reference.

Due to the positioning of an optical material comprising quantum confined semiconductor nanoparticles in features or layers resulting from these deposition techniques, not all of the surfaces of the nanoparticles may be available to absorb and emit light.

In certain embodiments, an optical material comprising quantum confined semiconductor nanoparticles can be deposited on a surface using contact printing. See, for example, A. Kumar and G. Whitesides, *Applied Physics Letters*, 63, 2002-2004, (1993); and V. Santhanam and R. P. Andres, *Nano Letters*, 4, 41-44, (2004), each of which is incorporated by reference in its entirety.

This technique can be use for depositing various thicknesses of optical materials comprising quantum confined semiconductor nanoparticles. In certain embodiments the thickness is selected to achieve the desired % absorption thereby. Most preferably, the quantum confined semiconductor nanoparticles do not absorb any, or absorb only negligible amounts of, the re-emitted photons.

In certain embodiments, material (e.g., an optical material) is applied to one or more predefined or predetermined regions on a substrate. The predefined region is a region on the substrate where the material is selectively applied. In certain embodiments wherein the optical component includes one or more different types of quantum confined semiconductor nanoparticles to compensate for more than one spectral deficiency of a light source, different types of quantum confined semiconductor nanoparticle can optionally be included in one or more different optical materials. In certain embodiments wherein the optical component includes one or more different types of quantum confined semiconductor nanoparticles to compensate for more than one spectral deficiency of a light source, different types of quantum confined semiconductor nanoparticle can optionally be included in two or more different optical materials, and each of the different optical materials can be applied to different regions of the substrate and/or as separate layers over the substrate. The material and substrate can be chosen such that the material remains substantially entirely within the predetermined area.

An optical material comprising quantum confined semiconductor nanoparticles can alternatively be deposited by solution based processing techniques, phase-separation, spin casting, ink-jet printing, silk-screening, and other liquid film techniques available for forming patterns on a surface.

Alternatively, quantum confined semiconductor nanoparticles can be dispersed in a light-transmissive host material (e.g., a polymer, a resin, a silica glass, or a silica gel, etc., which is preferably transparent, to at least predetermined wavelengths of light and in which quantum confined semiconductor nanoparticles can be dispersed) that is deposited as a full or partial layer or in a patterned arrangement by any of the above-listed or other known techniques. Suitable materials include many inexpensive and commonly available materials, such as polystyrene, epoxy, polyimides, and silica glass. After application to the surface, such material may contain a dispersion of quantum confined semiconductor nanoparticles where the nanoparticles have been size selected so as to produce light of a given color. Other configurations of quantum confined semiconductor nanoparticles disposed in a material, such as, for example, a two-dimensional layer on a substrate with a polymer overcoating are also contemplated.

As used herein, "top", "bottom", "over", and "under" are relative positional terms, based upon a location from a reference point. More particularly, "top" means farthest away from a reference point, while "bottom" means closest to the reference point. Where, e.g., a layer is described as disposed or deposited "over" a component or substrate, there may be other layers or other features or components between the layer and component or substrate. As used herein, "cover" is also a relative position term, based upon a location from a reference point. For example, where a first material is described as covering a second material, the first material is disposed over, but not necessarily in contact with the second material.

As used herein, the singular forms "a", "an" and "the" include plural unless the context clearly dictates otherwise. Thus, for example, reference to an emissive material includes reference to one or more of such materials.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

The invention claimed is:

1. An optical component for altering light emitted by a light source, the optical component comprising a first substrate, an optical material comprising quantum confined semiconductor nanoparticles disposed over a predetermined region of a first surface of the first substrate, a layer comprising an adhesive material disposed over the optical material and any portion of the first surface of the first substrate not covered by the optical material, and a second substrate disposed over the layer comprising an adhesive material, wherein the first and second substrates are sealed together, wherein the first substrate, the adhesive material, and the second substrate are at least 90% optically transparent to at least predetermined wavelengths of light passing into and out of the optical component, and wherein the adhesive material does not yellow or discolor during use of the optical component so as to substantially alter optical properties of the optical component.

2. An optical component in accordance with claim 1 wherein the optical component comprises one or more different types of quantum confined semiconductor nanoparticles, wherein each different type of quantum confined semiconductor nanoparticles emits light at predetermined wavelength that is different from the predetermined wavelength emitted by at least one of another type of quantum confined semiconductor nanoparticles included in the optical material.

3. An optical component in accordance with claim 1 wherein the optical component includes two or more different types of quantum confined semiconductor nanoparticles that emit at different predetermined wavelengths, wherein the different types of quantum confined semiconductor nanoparticles are included in two or more different optical materials.

4. An optical component in accordance with claim 1 wherein quantum confined semiconductor nanoparticles comprise semiconductor nanocrystals.

5. An optical component in accordance with claim 1 wherein the quantum confined semiconductor nanoparticles have a solid state quantum efficiency of at least 40%.

6. An optical component in accordance with claim 1 wherein the optical material further comprises a host material in which the quantum confined semiconductor nanoparticles are distributed.

7. An optical component in accordance with claim 1 wherein the optical material further comprises light scatterers.

8. An optical component in accordance with claim 1 wherein the optical material is fully encapsulated.

9. An optical component in accordance with claim 1 wherein the adhesive material comprises a UV curable acrylate urethane.

10. A lighting device comprising a light source, and an optical component that is positioned to receive at least a portion of the light generated by the light source, the optical component comprising an optical component in accordance with claim 1.

11. A lighting device in accordance with claim 10 wherein the light source comprises a solid state semiconductor light emitting diode.

12. An optical component in accordance with claim 1 wherein the quantum confined semiconductor nanoparticles in the optical material have a solid state photoluminescent quantum efficiency of at least about 70%.

13. An optical component in accordance with claim 1 wherein the quantum confined semiconductor nanoparticles in the optical material have a solid state photoluminescent quantum efficiency of at least about 80%.

14. An optical component in accordance with claim 1 wherein the quantum confined semiconductor nanoparticles in the optical material have a solid state photoluminescent quantum efficiency of at least about 90%.

15. An optical component in accordance with claim 1 wherein the adhesive material has oxygen barrier properties.

16. An optical component in accordance with claim 1 wherein the adhesive material has oxygen and moisture barrier properties.

17. An optical component in accordance with claim 1 wherein the optical material comprises one or more different types of quantum confined semiconductor nanoparticles, wherein each different type of quantum confined semiconductor nanoparticles emits light at predetermined wavelength that is different from the predetermined wavelength emitted by at least one of another type of quantum confined semiconductor nanoparticles included in the optical material.

18. An optical component in accordance with claim 1 wherein the optical material comprises two or more optical materials.

19. An optical component in accordance with claim 18 wherein the different optical materials are included in the optical component as separate layers of a layered arrangement.

20. An optical component in accordance with claim 1 further including a second optical material comprising quantum confined semiconductor nanoparticles disposed between the layer comprising the adhesive material and the second substrate.

21. An optical component in accordance with claim 1 wherein the optical component includes an edge seal area between the perimeter of the predetermined region comprising the optical material and the edges of the sealed structure, wherein the edge seal area includes no optical material.

22. An optical component in accordance with claim 1 wherein one or both of the substrate surfaces internal to the optical component are smooth.

23. An optical component in accordance with claim 1 wherein the second substrate includes a second optical material comprising quantum confined semiconductor nanoparticles disposed over a second predetermined region of the surface thereof facing the first surface of the first substrate.

24. An optical component in accordance with claim 1 wherein the optical material comprising quantum confined semiconductor nanoparticles is disposed on a predetermined region of a first surface of the first substrate, the layer comprising the adhesive material is disposed on the optical material and any portion of the first surface of the first substrate not covered by the optical material, and the second substrate is disposed on the layer comprising an adhesive material.

25. An optical component in accordance with claim 3 wherein the different optical materials are included in the optical component as separate layers of a layered arrangement.

26. An optical component in accordance with claim 3 wherein the different optical materials are included in the optical component as separate features of a patterned layer.

27. An optical component in accordance with claim 17 further including a second optical material comprising quantum confined semiconductor nanoparticles disposed between the layer comprising the adhesive material and the second substrate.

28. An optical component in accordance with claim 18 wherein the different optical materials are included in the optical component as separate features of a patterned layer.

29. An optical component in accordance with claim 18 wherein quantum confined semiconductor nanoparticles comprise semiconductor nanocrystals.

30. An optical component in accordance with claim 20 wherein the second optical material comprises one or more different types of quantum confined semiconductor nanoparticles, wherein each different type of quantum confined semiconductor nanoparticles emits light at predetermined wavelength that is different from the predetermined wavelength emitted by at least one of another type of quantum confined semiconductor nanoparticles included in the optical material.

31. An optical component in accordance with claim 20 wherein the second optical material comprises two or more optical materials.

32. An optical component in accordance with claim 20 wherein the optical material and second optical material are disposed in the same predetermined arrangement and are aligned such that the second optical material is superimposed over the optical material.

33. An optical component in accordance with claim 23 wherein the optical component includes an edge seal area between the outer perimeter of the optical materials included in the sealed structure and the edges of the sealed structure, wherein the edge seal area includes no optical material.

34. An optical component in accordance with claim 24 further including a second optical material comprising quantum confined semiconductor nanoparticles disposed between the layer comprising the adhesive material and the second substrate.

* * * * *